United States Patent [19]

Bouillon

[11] 4,416,334
[45] Nov. 22, 1983

[54] POTATO HARVESTING APPARATUS

[76] Inventor: Alain M. Bouillon, Minnesota Ave., North Greenbush, N.Y. 12144

[21] Appl. No.: 425,518

[22] Filed: Sep. 28, 1982

[51] Int. Cl.³ .................. A01D 17/06; A01D 17/08
[52] U.S. Cl. ............................ 171/27; 171/126; 171/129; 171/133; 193/27; 193/32; 56/327 R; 56/14.6; 130/27 P
[58] Field of Search .................... 171/26, 27, 124, 128, 171/129, 132, 133, 138, 116; 56/14.4, 14.5, 14.6, 327 R, 327 A; 130/30 P, 27 P; 209/395, 406, 407, 410; 198/866, 848, 849, 835; 193/27, 32

[56] References Cited

U.S. PATENT DOCUMENTS

| | | | |
|---|---|---|---|
| 1,126,418 | 1/1915 | Dodge | 193/27 |
| 1,184,653 | 5/1916 | Lehrer | 130/30 P |
| 1,411,361 | 4/1922 | Krupa | 171/129 |
| 1,793,017 | 2/1931 | Runge | 209/407 |
| 2,296,851 | 9/1942 | Henry | 171/128 |
| 2,374,775 | 5/1945 | Parks | 209/395 |
| 2,670,846 | 3/1954 | Rienks et al. | 171/133 |
| 3,448,847 | 6/1969 | Csimma | 193/27 |
| 3,745,754 | 7/1973 | Gronberg | 56/364 |
| 4,174,920 | 11/1979 | Knox | 193/31 A |

FOREIGN PATENT DOCUMENTS

| | | | |
|---|---|---|---|
| 65131 | 7/1946 | Denmark | 171/133 |
| 778006 | 9/1957 | United Kingdom | 193/27 |

Primary Examiner—Gene Mancene
Assistant Examiner—David L. Tarnoff
Attorney, Agent, or Firm—Walter F. Wessendorf, Jr.

[57] ABSTRACT

Disclosed is a potato harvesting apparatus for removing practically all the dirt from harvested potatoes without bruising or damaging them. The apparatus has disk coulters that cut potato vines between rows, three each of primary, secondary and rubber-coated cylindrical cages arranged in order for harvesting material flow of the potatoes with the cages rotating at the same material-flow speed, a share that digs up the potatoes for pick up and transfer by the first primary cage, a cylinder raker to pick up and move excess vines, dirt and potatoes onto the second primary cage, shaker-tine assemblies that remove dirt and separate vines from the potatoes, a grinder suction fan that sucks up and deposits chopped up vines in the harvesting track where same are covered by dirt sifting down and through the cages that remove most of the dirt and break up the dirt clods.

8 Claims, 40 Drawing Figures

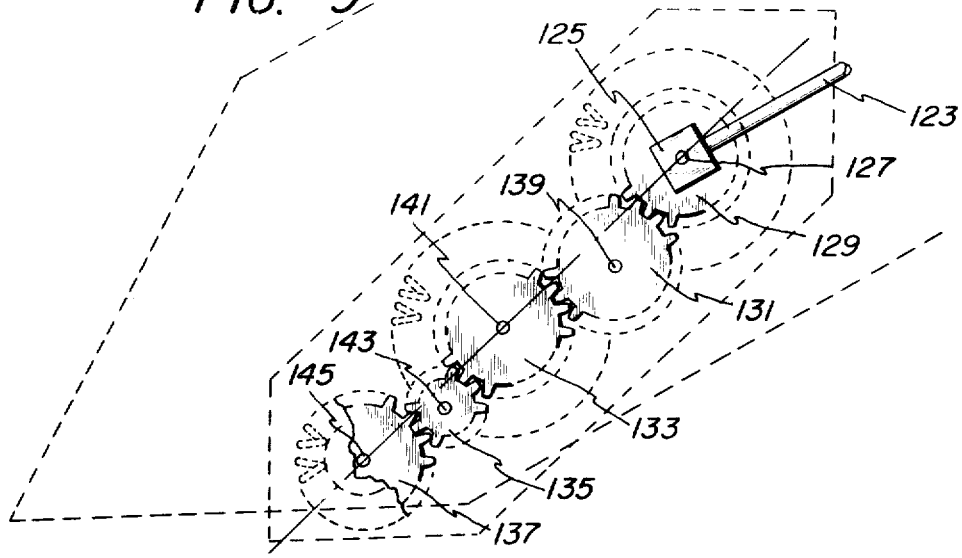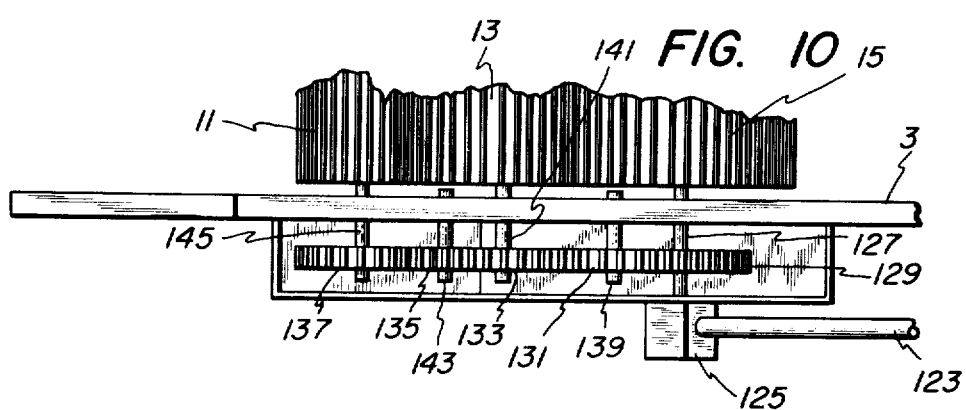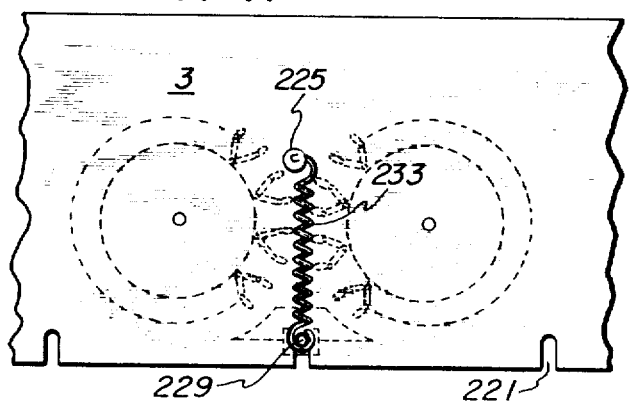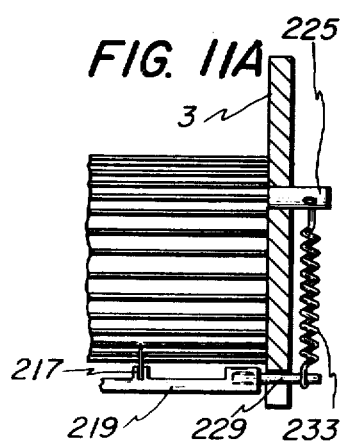

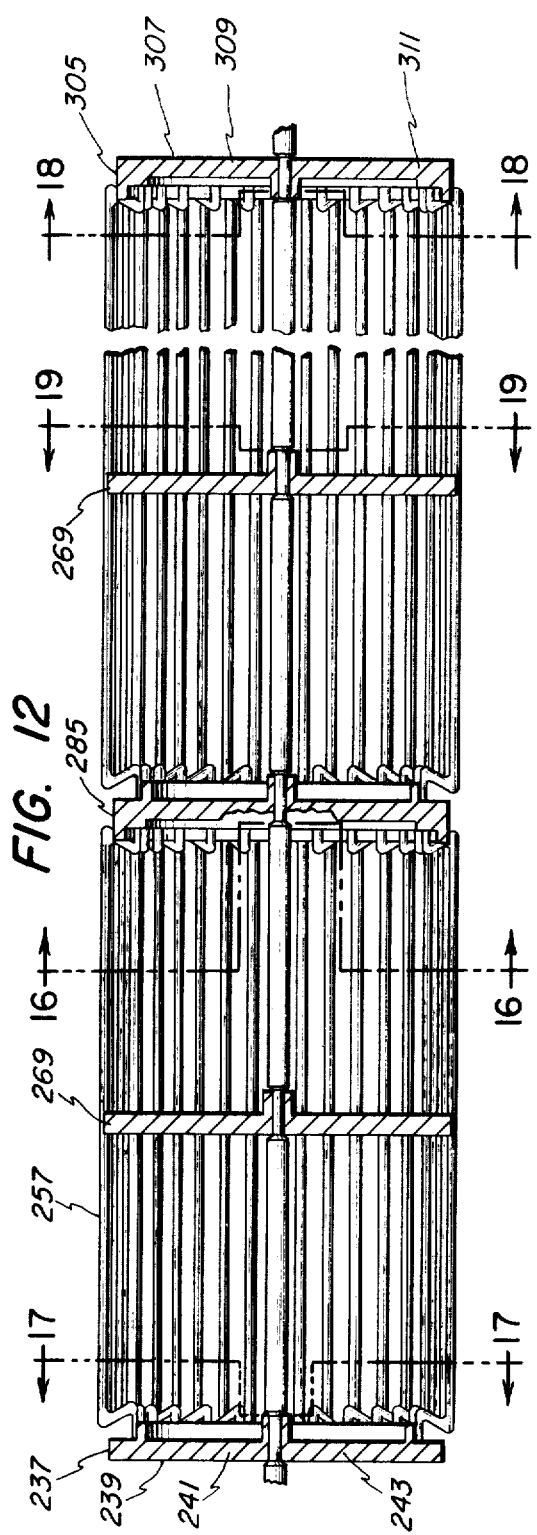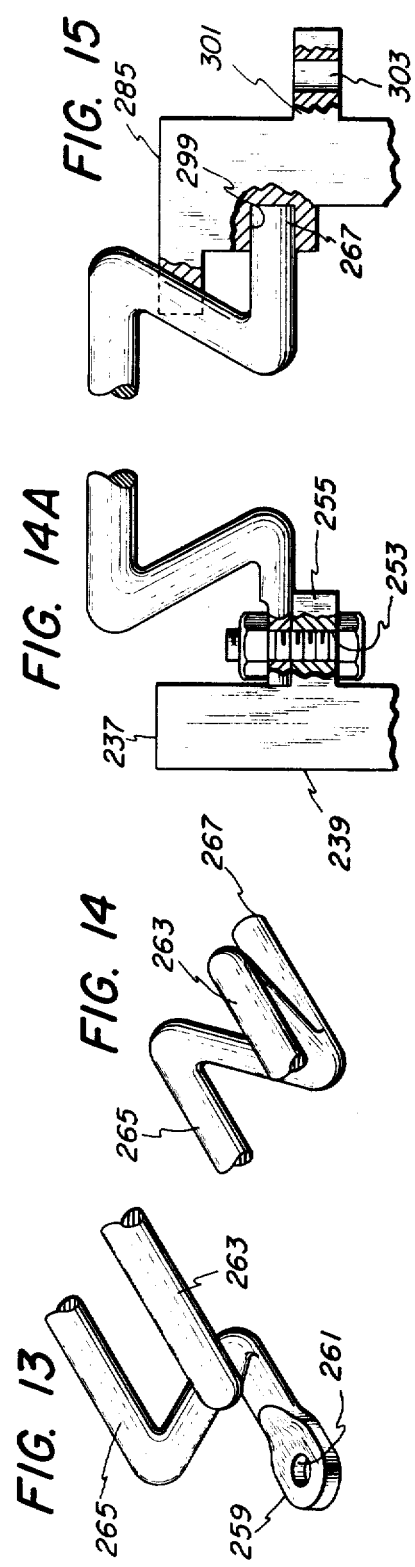

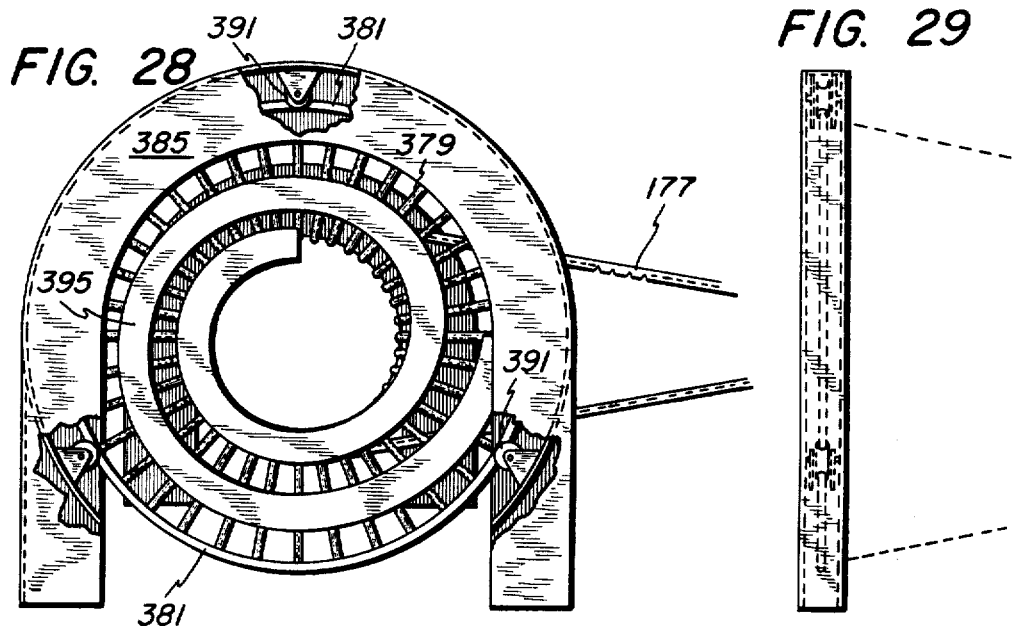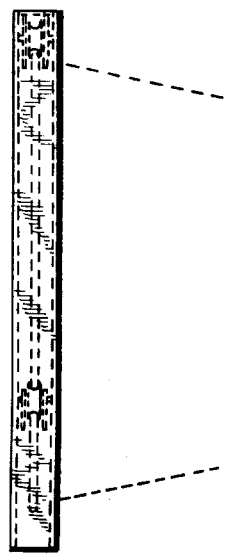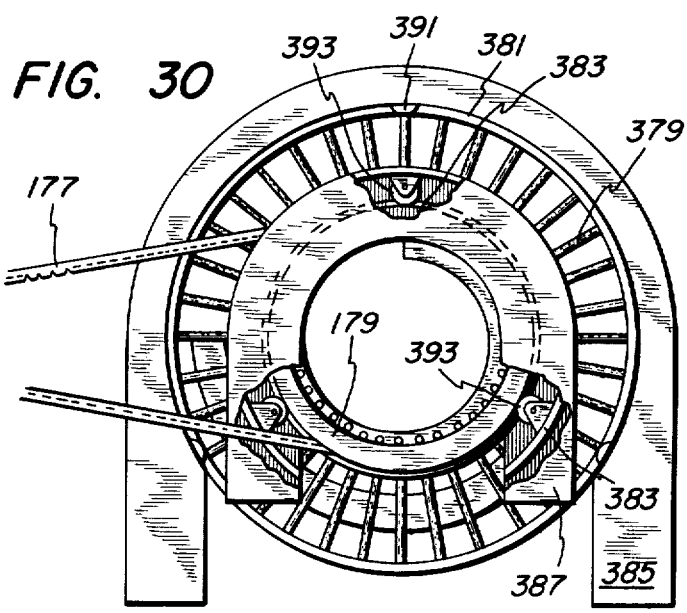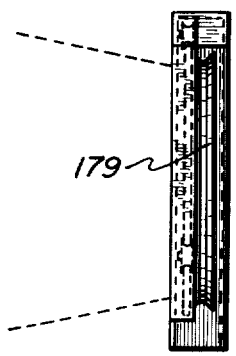

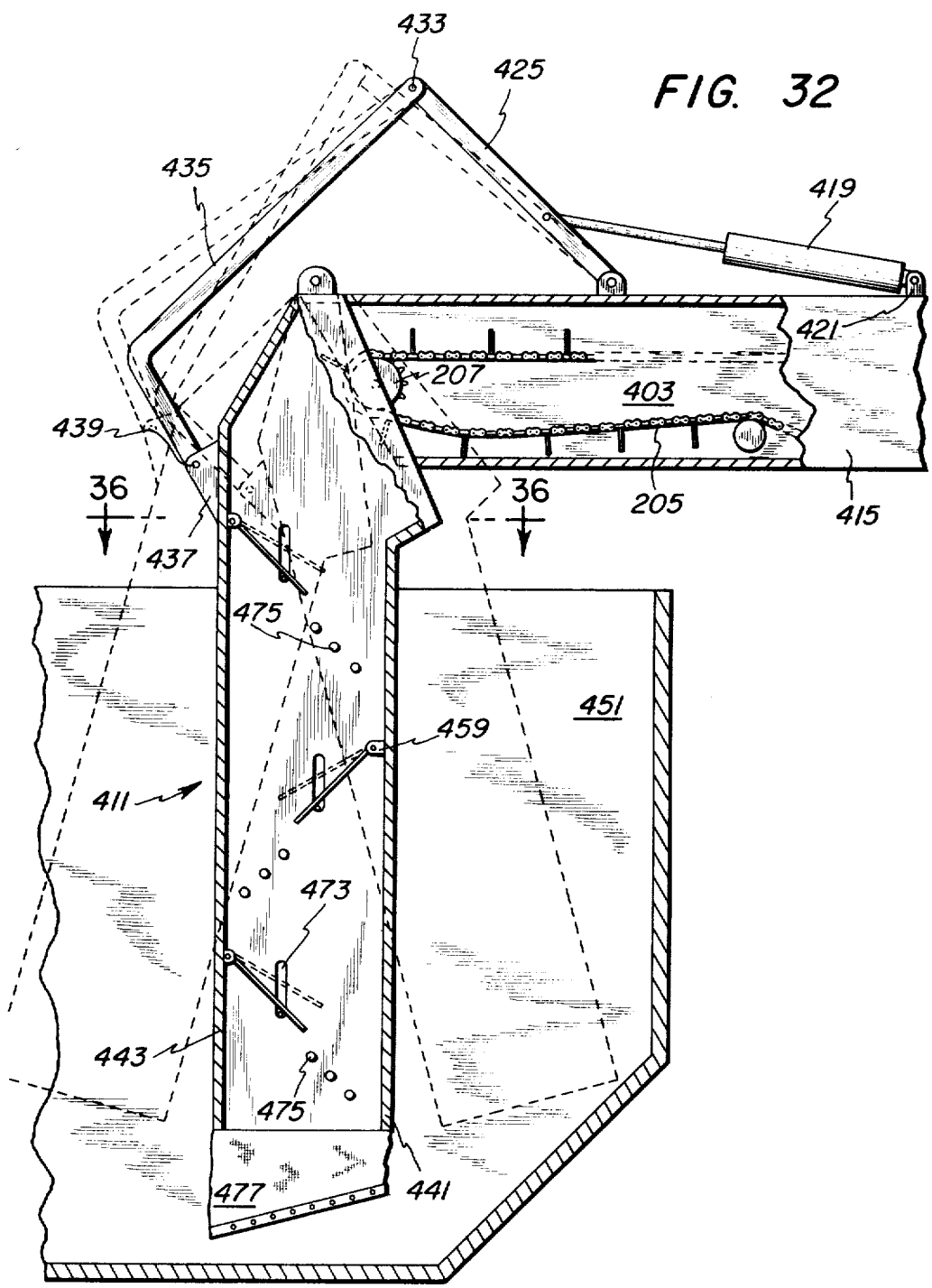

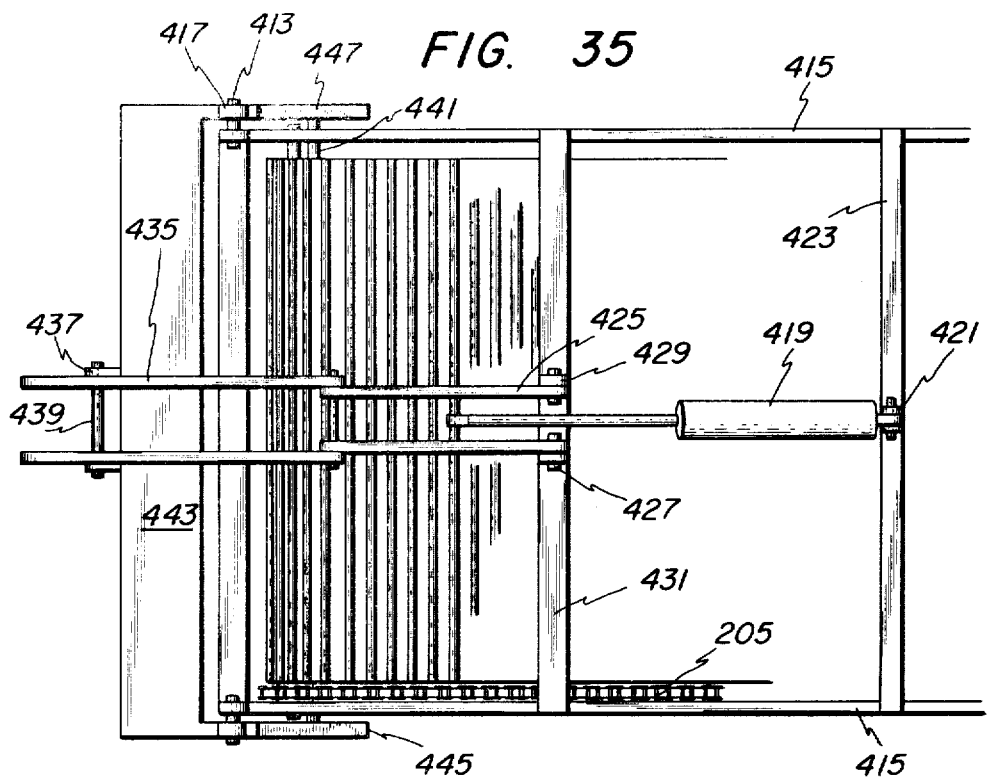
FIG. 35
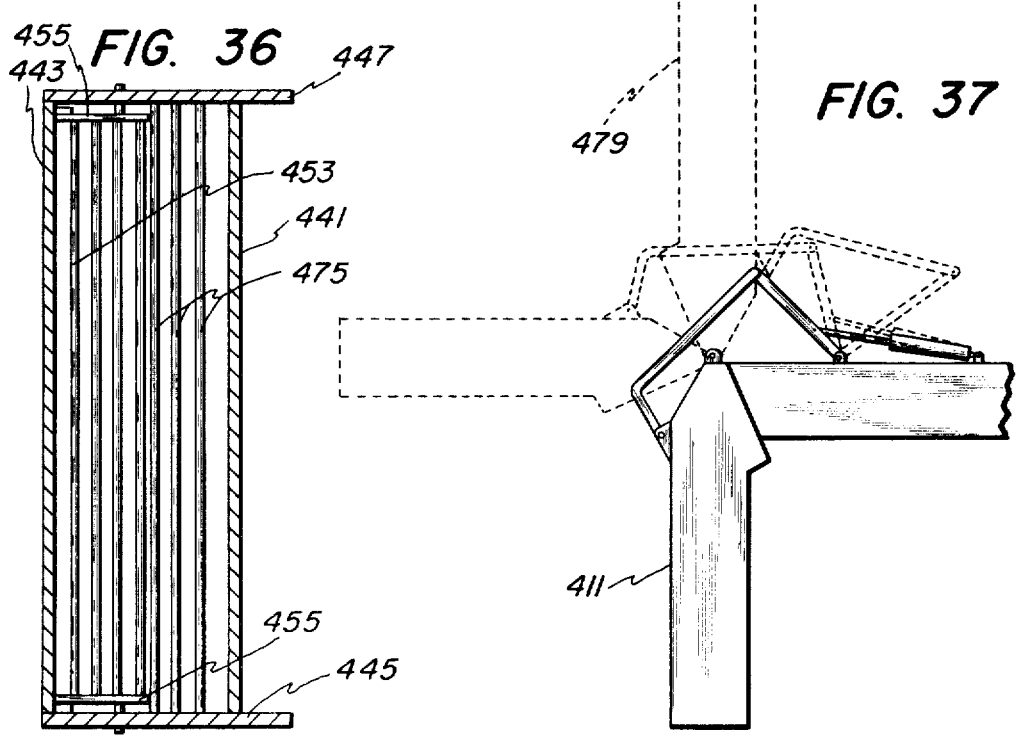
FIG. 36
FIG. 37

POTATO HARVESTING APPARATUS

BACKGROUND OF THE INVENTION

1. Technical Field

This invention relates to a potato harvesting apparatus for harvesting potatoes at maximum ground speed without regard to wet conditions, for removing during such harvesting operation practically all the dirt from the potatoes without bruising or otherwise damaging the potatoes, for depositing the potato vines in the harvesting track and covering same with the dirt removed from the potatoes.

2. Background Art

The prior art, U.S. Pat. No. 37,100, discloses a potato-digger; U.S. Pat. No. 432,992 discloses a potato digger and picker; U.S. Pat. No. 2,488,983 discloses a potato harvesting machine; and U.S. Pat. No. 2,521,581 discloses a potato digger with soil pulverizing and sifting screw.

The problem in the art is the need for a potato harvesting apparatus for harvesting potatoes at maximum ground speed without regard to wet conditions, for removing during such harvesting operation practically all the dirt from the potatoes without bruising or otherwise damaging the potatoes, for depositing the potato vines in the harvesting track and covering same with the dirt removed from the potatoes, and the need for an apparatus that does not have chain conveyors whose break-down time for repairs takes up at least one-third of the harvesting time.

Accordingly, the object of the invention is to contribute to the solution of the discussed problems of the prior art by providing a potato harvesting apparatus for removing practically all the dirt from the harvested potatoes without bruising or otherwise damaging them. The apparatus has disk coulters that cut the vines between the rows of potatoes; three each of primary, secondary and rubber-coated cylindrical cages arranged in order for harvesting the material flow of the potatoes with the cylindrical cages rotating at the same material-flow speed which the apparatus effects; a share that digs up the potatoes for pick up and transfer by the first one of the three primary cylindrical cages; a cylinder raker rotating in a counterclockwise direction opposite from the cylindrical cages to pick up and move the excess of vines, dirt and potatoes onto the second one of the primary cylindrical cages; shaker-tine assemblies that remove the dirt and separate the vines from the potatoes in the material flow; a grinder suction fan that sucks up the vines in proximal relationship to the upper shaker-tine assembly and deposits via a spreading pan and communicating conductor pipe the vines chopped up by the grinder fan in the harvesting track where the vines are covered by dirt sifting down and through the clockwise rotating primary, secondary and rubber-coated cylindrical cages that engage and remove most of the dirt from the potatoes as well as inclusively breaking up the dirt clods. The apparatus can operate at its maximum ground speed because the cylinder raker and cylindrical cages cooperate to pick up and transfer any excess in the harvested material flow of potatoes, dirt and vines without bunching up in front of the first primary cylindrical cage. Instead such excess is moved by the cylinder raker onto the second primary cylindrical cage. The structural design of the cylindrical cages with their easily replaceable twin-tine rods minimizes break-down time for repair.

SUMMARY OF THE INVENTION

In accordance with the invention, there are provided disk coulters that separate and cut the vines between the rows of potatoes; in the order for harvesting the material flow of the potatoes: Three primary cylindrical cages, followed by three secondary cylindrical cages and then three rubber-coated cylindrical cages, and with all the cylindrical cages rotating clockwise at the same material-flow delivery speed; a share that digs up the potatoes for pick up and transfer by the first primary cylindrical cage for transfer to the other cylindrical cages; a cylinder raker rotating counterclockwise and disposed before and above the first cylindrical cage to pick up and move the excess of vines, dirt and potatoes onto the second primary cylindrical cage; upper and lower shaker-tine assemblies that remove dirt and separate the vines from the potatoes in the material flow in a downwardly sloped direction away from the third and last rubber-coated cylindrical cage, and with the tines of the upper shaker-tine assembly being more widely spaced than the tines of the lower-shaker tine assembly to allow the potatoes to drop through the upper tines onto the lower tines; a grinder suction fan that sucks up the vines from the upper tines and deposits by means of a spreading pan and communicating conductor pipe the vines chopped up by the grinder fan in the harvesting track where such deposited vines are covered by dirt sifting down and through the rotating primary, secondary and rubber-coated cylindrical cages that engage and remove most of the dirt from the potatoes as well as inclusively breaking up the dirt clods; a rotating conical cage having an upstanding helical rubber vane spiraling the potatoes from the lower shaker-tine assembly to a chain conveyor whose horizontal boom portion discharges into a multi-positional loading boom; and such loading boom conducting the potatoes downwardly via directional vanes and impact dampening flexible members that absorb impact from the potatoes, and a double-acting hydraulic cylinder operatively connected with such loading boom to allow such loading boom to be moved back and forth so that the potatoes will evenly fill the loading vehicle without bruising or otherwise damaging the potatoes.

BRIEF DESCRIPTION OF THE DRAWINGS

This object and other objects of the invention should be discerned and appreciated by reference to the drawings, wherein like reference numerals refer to similar parts throughout the several views, in which:

FIG. 9 is a side elevation detail of the gear train for the three primary cylindrical cages;

FIG. 10 is a top view of the gear train assembly;

FIG. 11 is a side elevation detail of the cutting blade;

FIG. 11A is a front view of FIG. 11;

FIG. 12 is a front elevation section of the cylindrical cage;

FIG. 13 is an enlarged isometric detail of one end of the removable twin-tine rod;

FIG. 14 is an enlarged isometric detail of the other end of the twin-tine rod;

FIG. 14A is an enlarged front elevation section of the one end of the twin-tine rod bolted to an ear;

FIG. 15 is an enlarged front elevation of the other end of the twin-tine rod in the combined disc;

FIG. 28 is a front elevation view of the conical cage and the upper support housing;

FIG. 29 is a side elevation view of the conical cage and upper support housing;

FIG. 30 is a rear elevation view of the conical cage showing the roller pulleys and the driven pulley;

FIG. 31 is a side elevation view of the bottom support housing;

FIG. 32 is a side elevation section of the multi-positionable loading boom;

FIG. 35 is a plan view of the end of the boom portion of the conveyor and the loading boom assembly;

FIG. 36 is a sectional view taken in the direction of the arrows 36—36 in FIG. 32;

FIG. 37 is a diagram of various positions of the multi-positionable loading boom.

DESCRIPTION OF THE PREFERRED EMBODIMENT

Figure 1:
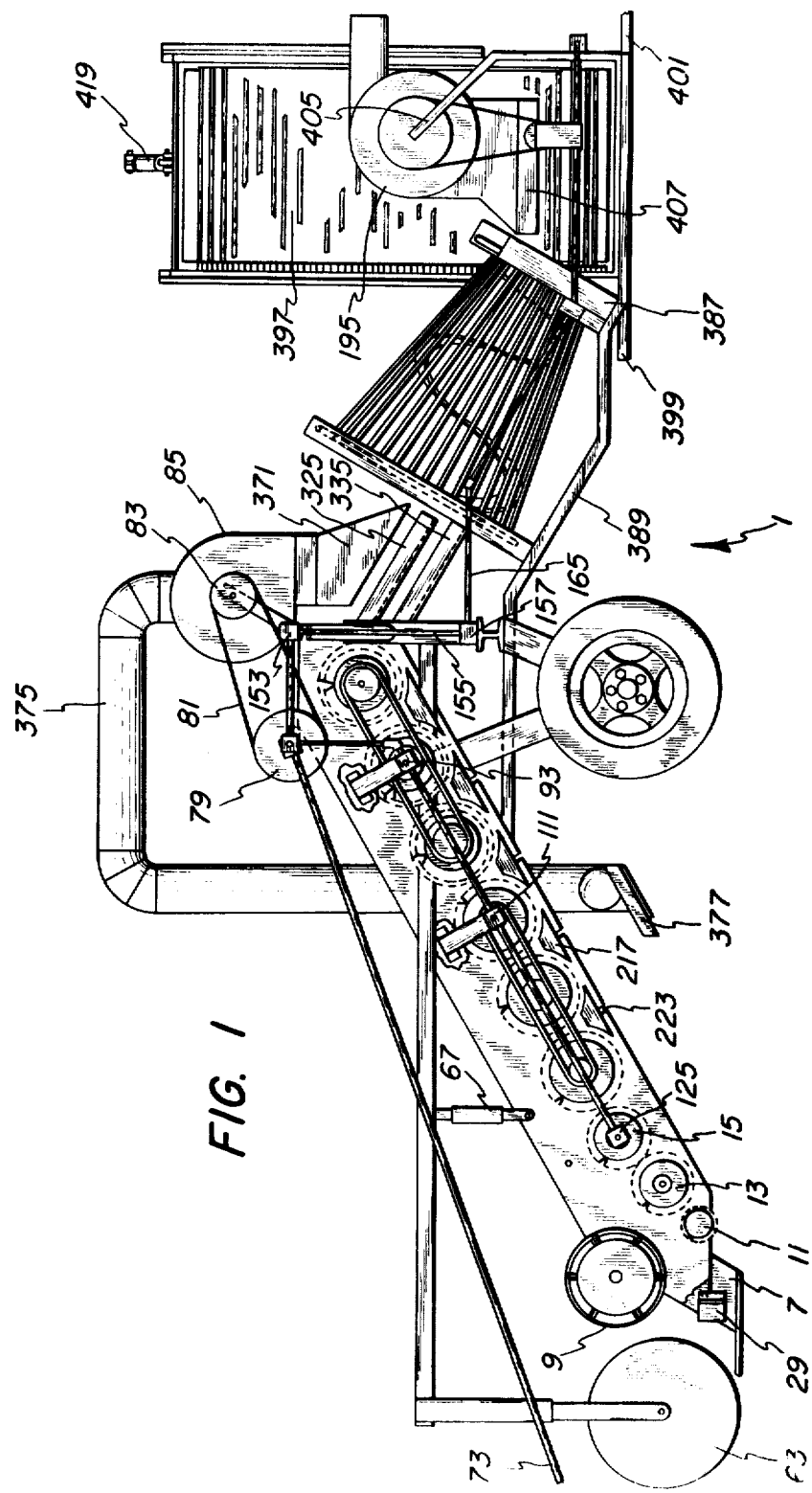
FIG. 1 is a side elevation view of the potato harvesting apparatus with a side frame removed.
Figure 2:
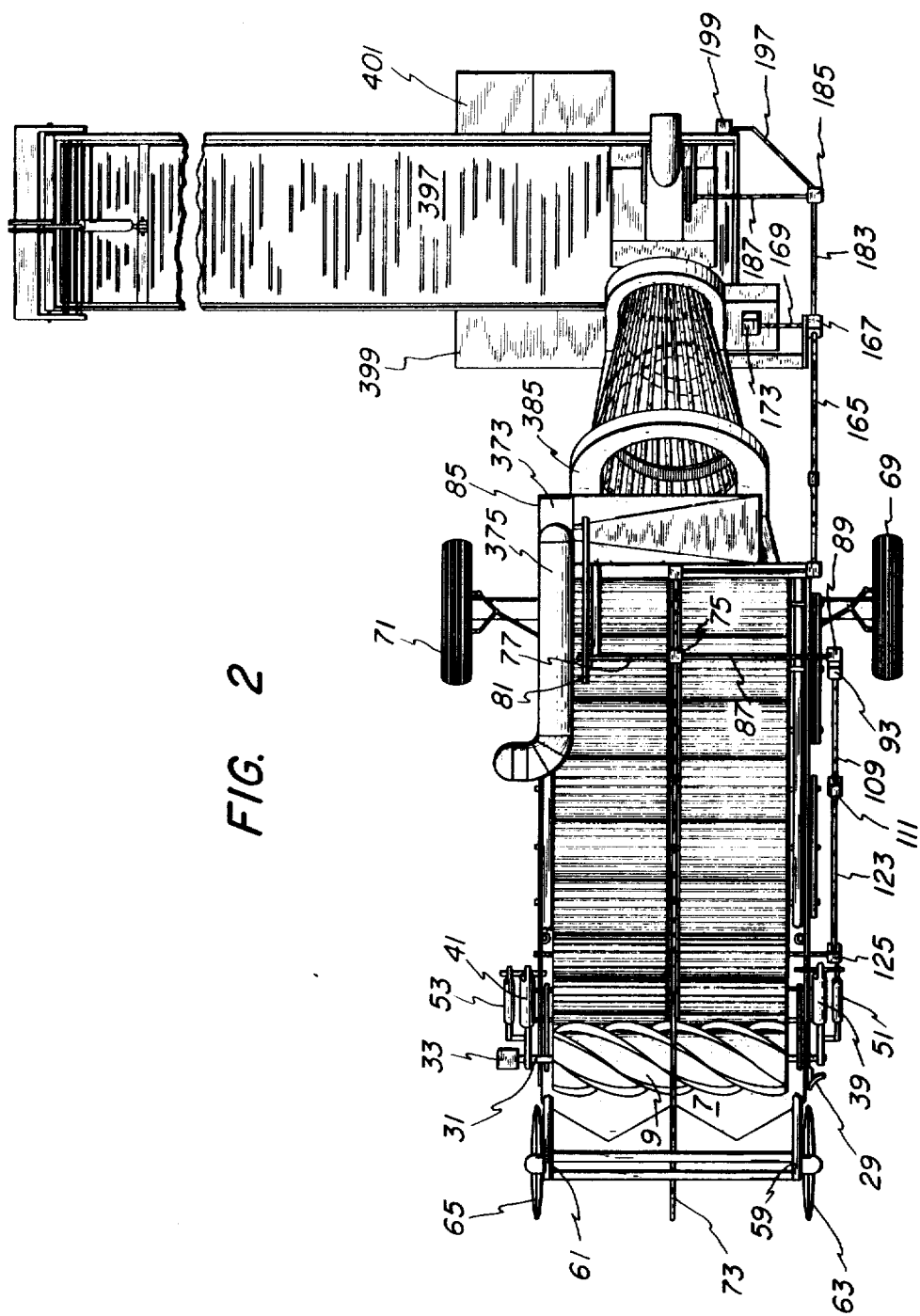
FIG. 2 is a plan view of the apparatus.
Figure 3:
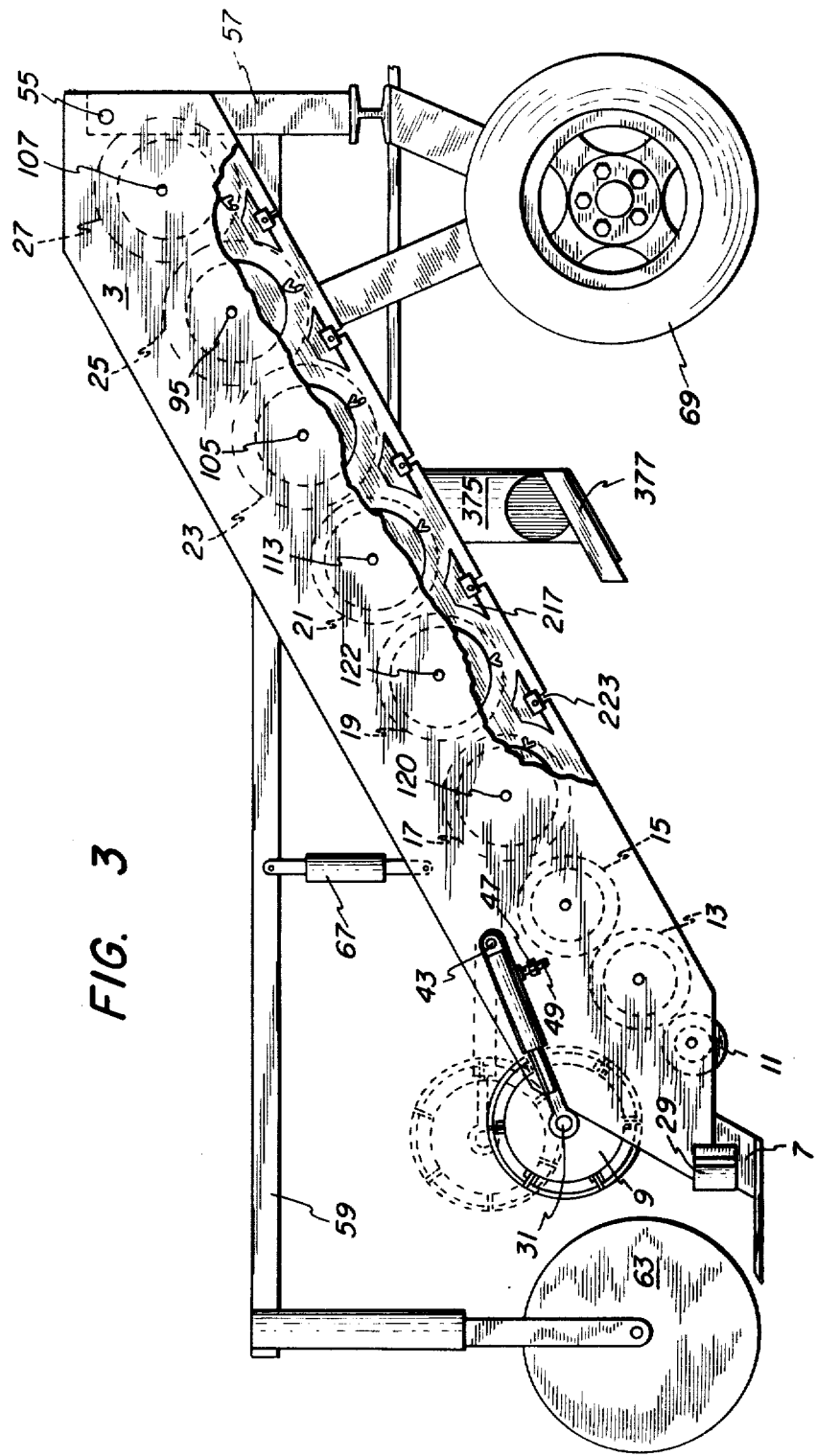
FIG. 3 is a side elevation of the front part of the apparatus.
Figure 4:
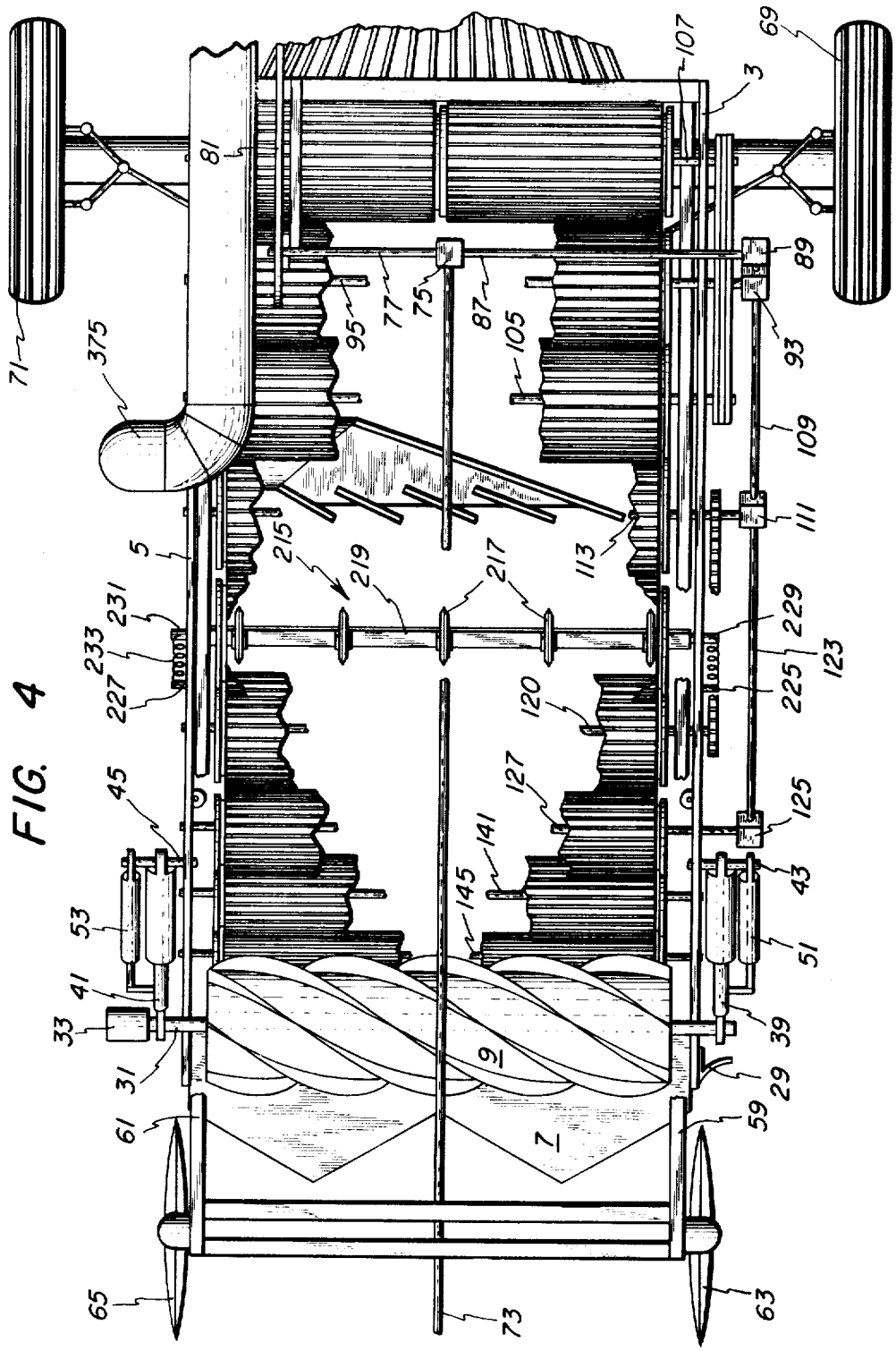
FIG. 4 is a plan view of the front part of the apparatus showing the top view of the details of FIG. 3.
Figure 5:
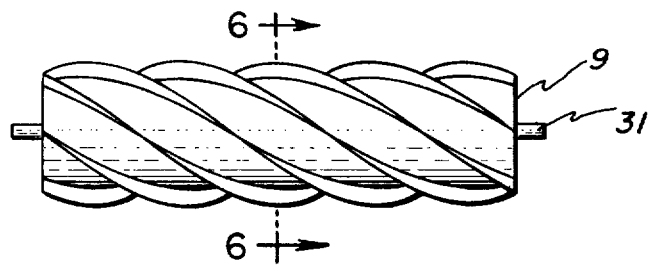
FIG. 5 is a front elevation of the cylinder raker.
Figure 6:
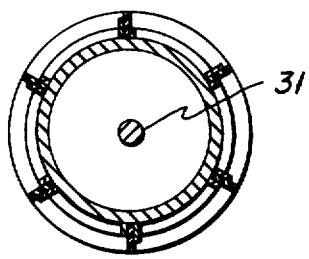
FIG. 6 is a side elevation of the cylinder raker.
Figure 7:
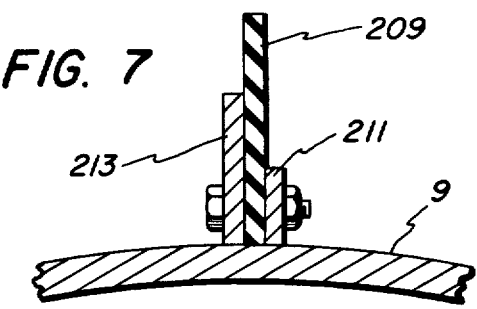
FIG. 7 is an enlarged detail of the rubber paddle assembly of the cylinder raker.
Figure 8:
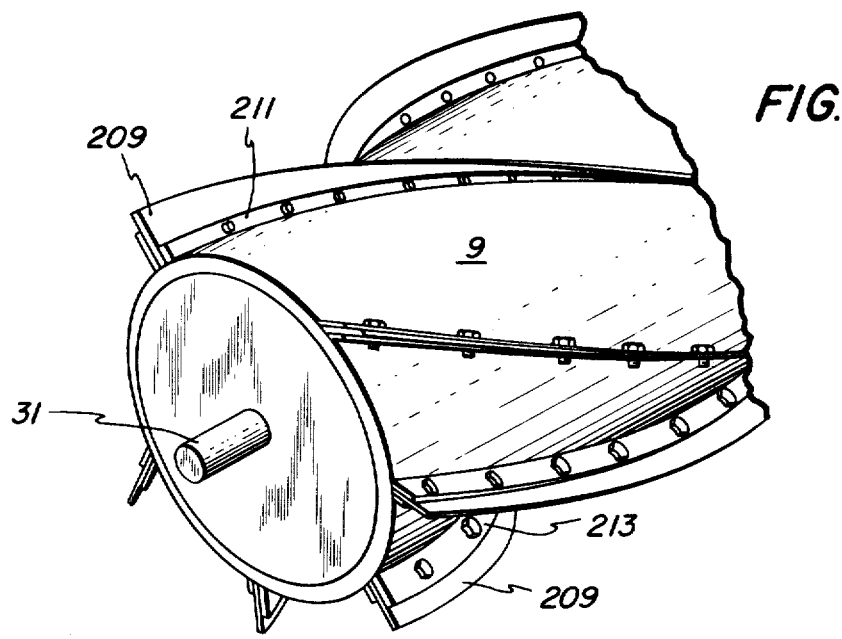
FIG. 8 is an isometric view of one end of the cylinder raker assembly.

To facilitate understanding of the invention, a nomenclature list is herewith provided, to wit:

1—generally refers to the invention
3—frame
5—frame
7—share
9—cylinder raker
11—primary cylindrical cage
13—primary cylindrical cage
15—primary cylindrical cage
17—secondary cylindrical cage
19—secondary cylindrical cage
21—secondary cylindrical cage
23—rubber-coated cylindrical cage
25—rubber-coated cylindrical cage
27—rubber-coated cylindrical cage
29—gear drive deflector
31—shaft fixed to cylinder raker 9
33—hydraulic motor driving shaft 31
35—oil line to motor 33
37—oil line to motor 33
39—slide on frame 3
41—slide on frame 5
43—pin
45—pin
47—transversely projecting ear
49—screw engaging ear 47
51—double-acting hydraulic cylinder
53—double-acting hydraulic cylinder
55—pivotal relationship indication
57—superstructure
59—frame carried by 57
61—frame carried by 57
63—disk coulter
65—disk coulter
67—double-acting hydraulic cylinder
69—linkage-steerable wheel
71—linkage-steerable wheel
73—main drive shaft from tractor PTO
75—gear box
77—shaft
79—drive pulley fixed to shaft 77
81—drive belt
83—driven pulley
85—suction fan
87—shaft
89—gear box
91—shaft
93—gear box
95—shaft fixed to cage 25
97—drive pulley fixed to shaft 95
99—drive belt
101—pulley fixed to shaft 105
103—pulley fixed to shaft 107
105—shaft fixed to cage 23
107—shaft fixed to cage 27
109—shaft
111—gear box
113—shaft fixed to cage 21
115—drive sprocket fixed to shaft 113
117—drive chain
119—driven sprocket fixed to shaft 120
120—shaft fixed to cage 17
121—driven sprocket fixed to shaft 122
122—shaft fixed to cage 19
123—shaft
125—gear box
127—shaft fixed to cage 15
129—spur gear fixed to shaft 127
131—spur gear free on jack shaft 139
133—spur gear fixed to shaft 141
135—spur gear free on jack shaft 143
137—spur gear fixed to shaft 145
139—jack shaft 141—shaft fixed to cage 13
143—jack shaft
145—shaft fixed to cage 11
147—shaft
149—gear box
151—shaft
153—gear box
155—shaft
157—gear box
159—cam shaft
161—upper shaker-tine assembly
163—lower shaker-tine assembly
165—shaft
167—gear box
169—shaft
171—gear box
173—shaft
175—drive pulley fixed to shaft 173
177—drive belt
179—driven pulley
181—conical cage
183—shaft
185—gear box
187—shaft
189—drive pulley fixed to shaft 187
191—drive belt
193—driven pulley
195—fan
197—shaft
199—gear box
201—shaft
203—drive sprocket fixed to shaft 201
205—conveyor chain
207—driven sprocket
209—upstanding rubber paddle
211—mounting bracket
213—mounting bracket
215—general reference to knives
217—upstanding cutting blade
219—rod
221—guide slot in frame 3
223—guide slot in frame 5
225—transverse pin projecting outwardly from frame 3
227—transverse pin projecting outwardly from frame 5
229—outwardly extending end of rod 219
231—outwardly extending end of rod 219
233—tension spring
235—shoulder portion on shaft 145
237—left end disc
239—outward facing smooth lateral surface of disc 237
241—upper half of disc 237
243—lower half of disc 237
245—upper common flange
247—lower common flange
249—upper hub
251—lower hub
253—ear on disc 237
255—hole in ear 253
257—twin-tine rod
259—single end portion of rod 257
261—hole in 259
263—tine of rod 257
265—tine of rod 257
267—single end portion of rod 257
269—middle disc
271—upper half of disc 269
273—lower half of disc 269
275—upper common flange
277—lower common flange
279—upper hub
281—lower hub
283—peripheral recess on middle disc 269
285—combined disc
287—upper half of combined disc 285
289—lower half of combined disc 285
291—upper common flange
293—lower common flange
295—upper hub
297—lower hub
299—transverse hole in disc 285
301—ear on disc 285
303—hole in ear 301
305—right end disc
307—outward facing smooth lateral surface of disc 305
309—upper half of disc 305
311—lower half of disc 305
313—upper common flange
315—lower common flange
317—upper hub
319—lower hub
321—transverse hole in disc 305
323—upper cross element of upper shaker-tine assembly 161
325—converging wall of assembly 161
327—converging wall of assembly 161
329—front wall of assembly 161
331—tine of assembly 161
333—upper cross element of lower shaker-tine assembly 163
335—converging lateral wall of assembly 163
337—converging lateral wall of assembly 163
339—front element of assembly 163
341—tine of assembly 163
343—vertical member
345—outwardly projecting pin of member 343
347—outwardly projecting pin of member 343
349—guide slot of vertical mounting bracket 353
351—guide slot of vertical mounting bracket 353
353—vertical mounting bracket depending from superstructure 355
355—I-shaped superstructure
357—pillow block upstanding from 355 journalling shaft 159
361—cam on shaft 159
363—roller follower mounted by cross pin 365
365—cross pin in legs 367 and 369
367—bifurcated leg of vertical member 343
369—bifurcated leg of vertical member 343
371—intake hood of grinder suction fan 85
373—exhaust duct of fan 85
375—conductor pipe communicating with duct 373
377—spreading pan
379—lateral tine of conical cage 181
381—upper ring of cage 181
383—bottom ring of cage 181
385—upper U-shaped support housing fixed to superstructure 389
387—bottom U-shaped support housing fixed to superstructure 389
389—superstructure
391—upper roller pulley fixed to support housing 385

393—bottom roller pulley fixed to support housing 387
395—helical rubber vane fixed to conical cage 181
397—conveyor
399—platform
401—container
403—horizontal boom portion of conveyor 397
405—frame
407—intake hood of suction fan 195
409—exhaust duct of fan 195
411—multi-positionable loading boom
413—pivot pin carried by frame sidewall 415
415—frame sidewall of conveyor 397
417—upstanding ear of boom 411
419—double-acting hydraulic cylinder
421—ear upstanding from cross member 423
423—cross member fixed to frame sidewall 415
425—link
427—cross pin
429—ear upstanding from cross member 431
431—cross member fixed to frame sidewall 415
433—cross pin
435—L-shaped link
437—ear on boom 411
439—cross pin on ear 437
441—front wall of boom 411
443—rear wall of boom 411
445—side wall of boom 411
447—side wall of boom 411
449—directional vane
451—loading vehicle
453—tine of directional vane 449
455—lateral element
457—pin carried by lateral element 455
461—cross pin fixed to rod 463
463—rod
465—U-bolt
467—rack fixed to rod 463
469—pinion meshing with rack 467
471—handle fixed to pinion 469
473—guide slot
475—flexible member
477—canvas bag
479—indication of upright position of boom 411

In FIG. 1 of the drawings, reference numeral 1 generally refers to the potato harvesting apparatus of this invention which is pulled and hauled by a tractor or other suitable prime mover (not shown).

Apparatus 1 has parallel frames 3 and 5 which fixedly carry share 7 therebetween, mount a cylinder raker 9, three primary cylindrical cages 11, 13 and 15, three secondary cylindrical cages 17, 19 and 21, and three rubber-coated cylindrical cages 23, 25, 27. The cylindrical cages 11, 13, 15, 17, 19, 21, 23, 25 and 27 are carried on shafts mounted in bearings on frames 3 and 5. A gear drive deflector 29 is carried on the lower end of frame 3 to deflect any potatoes, rocks, vines or dirt from entering the gear drive associated with the primary cylindrical cages 11, 13 and 15.

A shaft 31, fixed to cylinder raker 9, is driven in a counterclockwise direction by a hydraulic motor 33. Oil from a hydraulic pump on the tractor or prime mover flows via lines 35 and 37 to hydraulic motor 33. Shaft 31 is freely carried by slides 39 and 41 pivotally mounted on frames 3 and 5 by pins 43 and 45. Transversely projecting ears 47, having tapped holes operatively engaged by screws 49, function as adjustable limit stops to pivotally move slides 39 and 41 up or down by virtue of the engagement of screws 49 with slides 39 and 41. Double-acting hydraulic cylinders 51 and 53 are pivotally mounted by pins 43 and 45, and operatively engage the slides 39 and 41 to adjustably extend or retract shaft 31.

Frames 3 and 5 are in pivotal relationship at 55 with superstructure 57. Frames 59 and 61, carried by superstructure 57, freely mount disk coulters 63 and 65. Relative adjustment between frames 3 and 5, and 59 and 61, is effected by double-acting hydraulic cylinders 67 (only one of which is shown) pivotally mounted therebetween.

Superstructure 57 appropriately mounts linkage-steerable wheels 69 and 71, as shown.

The potato harvesting apparatus is operatively connected to such prime mover to operatively conduct and drive the potato harvesting apparatus along the row of potatoes to be harvested.

The main drive shaft 73 is operatively connected to the power take off unit of such prime mover and thereby drives main drive shaft 73.

Main drive shaft 73 transmits drive through gear box 75 to drive shaft 77 and drive pulley 79 fixed therewith. A drive belt 81 operatively trained around drive pulley 79 and driven pulley 83 transmits drive to driven pulley 83 to drive suction fan 85.

Main drive shaft 73 also transmits drive through gear box 75 to drive shaft 87 which transmits drive through gear box 89 to drive shaft 91 and through gear box 93 to drive shaft 95 fixed to pulley 97 and the center one 25 of the rubber-coated cages. A drive belt 99 operatively trained around pulleys 97, 101 and 103 transmits drive to pulleys 101 and 103. Pulleys 97, 101 and 103 are fixed to respective shafts 95, 105 and 107, and respective rubber-coated cages 25, 23 and 27 are fixed to respective shafts 95, 105 and 107 to transmit drive thereto.

Shaft 91 also transmits drive through gear box 93 to drive shaft 109 and transmit drive through gear box 111 to drive shaft 113 fixed to drive sprocket 115. A drive chain 117 operatively trained around driven sprockets 119 and 121 transmits drive to sprockets 119 and 121. Shaft 120 is fixed to cage 17 and driven sprocket 119; and shaft 122 is fixed to cage 19 and driven sprocket 121.

Shaft 109 also transmits drive through gear box 111 to drive shaft 123 and transmits drive through gear box 125 to drive shaft 127 fixed to spur gear 129 and fixed to primary cylindrical cage 15 to drive primary cylindrical cage 15. Spur gear 129 meshes with spur gear 131; spur gear 131 meshes with spur gear 133; spur gear 133 meshes with spur gear 135; and spur gear 135 meshes with spur gear 137. Spur gear 129 and primary cylindrical cage 15 are fixed to shaft 127; spur gear 131 is free on jack shaft 139; spur gear 133 and primary cylindrical cage 13 are fixed to shaft 141; spur gear 135 is free on jack shaft 143; and spur gear 137 and primary cylindrical cage 11 are fixed to shaft 145.

The main drive shaft 73 also transmits drive through gear box 75 to shaft 147 which transmits drive through gear box 149 to shaft 151 which transmits drive through gear box 153 to shaft 155 which transmits drive through gear box 157 to cam shaft 159 to effect reciprocation of the upper and lower shaker-tine assemblies 161 and 163.

Shaft 155 also transmits drive through gear box 157 to shaft 165 through gear box 167 to shaft 169 which transmits drive through gear box 171 to shaft 173 fixed to drive pulley 175. A drive belt 177 operatively operatively trained around pulley 175 and driven pulley 179 transmits drive to driven pulley 179 to thereby drive and rotate conical cage 181.

Shaft 165 also transmits drive through gear box 167 to shaft 183 which transmits drive through gear box 185 to shaft 187 fixed to drive pulley 189. A drive belt 191 operatively trained around drive pulley 189 and driven pulley 193 transmits drive to driven pulley 193 to thereby drive fan 195.

Shaft 183 also transmits drive through gear box 185 to shaft 197 which transmits drive through gear box 199 to shaft 201 fixed to drive sprocket 203. A conveyor chain 205 operatively trained around drive sprocket 203 and driven sprocket 207 transmits drive to drive the conveyor chain 205.

Cylinder raker 9 carries, in helical arrangement and disposition on its outer surface, upstanding rubber paddles 209 sandwiched in fixed relationship between upstanding mounting brackets 211 and 213. Brackets 211 and 213 have aligned bolt holes by means of which brackets 211 and 213 are bolted together, as shown.

With reference to FIGS. 1, 3, 4, 11 and 11A, there are shown a series of knives, generally referred to by reference numeral 215, mounted below and between secondary cylindrical cages 17 and 19, cages 19 and 21, cage 21 and rubber-coated cage 23, rubber-coated cages 23 and 25 and 27. Each of the knives 215 comprises upstanding cutting blades 217 in equally-spaced relationship fixedly carried on a rod 219 movable within guide slots 221 and 223 in respective frames 3 and 5. In transverse relationship with frames 3 and 5 are outwardly projecting pins 225 and 227. Disposed and fixedly carried between pins 225 and 227, and the outwardly extending ends 229 and 231 of rods 219, are tensions springs 233. The knives 215 function and serve to cut up any vines in the material flow that slip between the secondary cylindrical cages and the rubber-coated cages. The guide slots 221 and 223, and the tension springs 233, cooperate to allow rod 219 to move downwardly sufficiently within guide slots 221 and 223 to allow a stone to pass through with the tension springs 233 restoring rod 219 to its original position.

With reference to FIGS. 12, 13, 14, 14A, 15, 16, 17, 18 and 19, the description herewith applies to cages 11, 13, 15, 17, 19, 21, 23, 25 and 27. Accordingly, it should be appreciated that the description with reference to primary cylindrical cage 11 fixed to shaft 145 is by way of example only.

Shaft 145 has shoulder portions 235, as shown. Each of the primary, secondary and rubber-coated cylindrical cages employs three or four types of discs. Each of the discs has an upper half and a lower half having upper and lower common flanges with aligned bolt holes for bolting the upper and lower flanges together. The upper and lower flanges further define upper and lower hubs which are complemental with the shoulder portion 235. The upper and lower hubs engage such shoulder portions 235 to thereby fix and index the upper and lower halves of the discs in place.

FIG. 12 shows a cylindrical cage comprising two sections. Left end disc 237 has a smooth lateral surface 239 facing outward. Left end disc 237 has upper and lower halves 241 and 243, upper and lower common flanges 245 and 247, and upper and lower hubs 249 and 251. The upper and lower flanges 245 and 247 have aligned bolt holes by means of which the upper and lower flanges 245 and 247 are bolted together. In transverse relationship with disc 237 and projecting inwardly are ears 253 having holes 255.

Each twin-tine rod 257 has a single end portions 259 having a hole 261 therethrough. End portion 259 bifurcates into two tines 263 and 265 which at the other remote terminal end converge to define single end portion 267.

Middle disc 269 has upper and lower halves 271 and 273, upper and lower common flanges 275 and 277, and upper and lower hubs 279 and 281. The upper and lower flanges 275 and 277 have aligned bolt holes by means of which the upper and lower flanges 275 and 277 are bolted together. Peripheral recesses 283 on middle disc 269 receive and mount the two tines 263 and 265 therein and maintain same in spaced relationship, as shown.

Combined disc 285 has upper and lower halves 287 and 289, upper and lower common flanges 291 and 293, and upper and lower hubs 295 and 297. The upper and lower flanges 291 and 293 have aligned bolt holes by means of which the upper and lower flanges 291 and 293 are bolted together. In transverse relationship with disc 285 are holes 299 which receive and mount the single end portions 267 of the twin-tine rods 257. In transverse relationship with disc 285 and projecting to the right are ears 301 having holes 303. Each hole 261 of a twin-tine rod 257 is aligned with a hole 303 of each 301 and bolted together.

Similarly and with respect to disc 237, each hole 261 of a twin-tine rod 257 is aligned with a hole 255 of an ear 253 and bolted together.

The right end disc 305 has a smooth lateral surface 307 facing outward. Right end disc 305 has upper and lower halves 309 and 311, upper and lower common flanges 313 and 315, and upper and lower hubs 317 and 319. The upper and lower flanges 313 and 315 have aligned bolt holes by means of which the upper and lower flanges 313 and 315 are bolted together. In transverse relationship with disc 305 are holes 321 which receive and mount the end portions 267 of the twin-tine rods 257.

It should be appreciated that if the cylindrical cage consisted of only one section, the right end disc 305 would be used in place of the combined disc 285.

Figure 16:
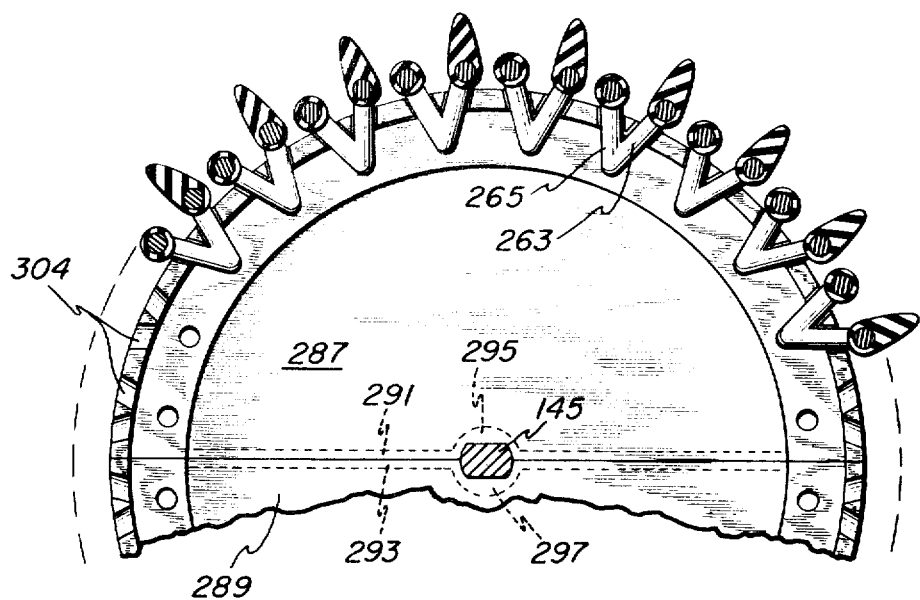
FIG. 16 is a partial sectional view taken in the direction of the arrows 16—16 in FIG. 12.

With reference to FIGS. 13, 14, 14A and 15, it should be appreciated that the single end portion 259 and the immediately adjacent portions of tines 263 and 265 are Z-shaped, and that the end portion 267 and the immediately adjacent portions of tines 263 and 265 are similarly Z-shaped. With reference to FIG. 16, it should be noted that combined disc 285 or right end disc 305 both have recesses 304 against which the Z-shaped portions defined by the end portions 267 and the immediately adjacent portions of tines 263 and 265 abut in engaged retentive relationship.

Figure 17:
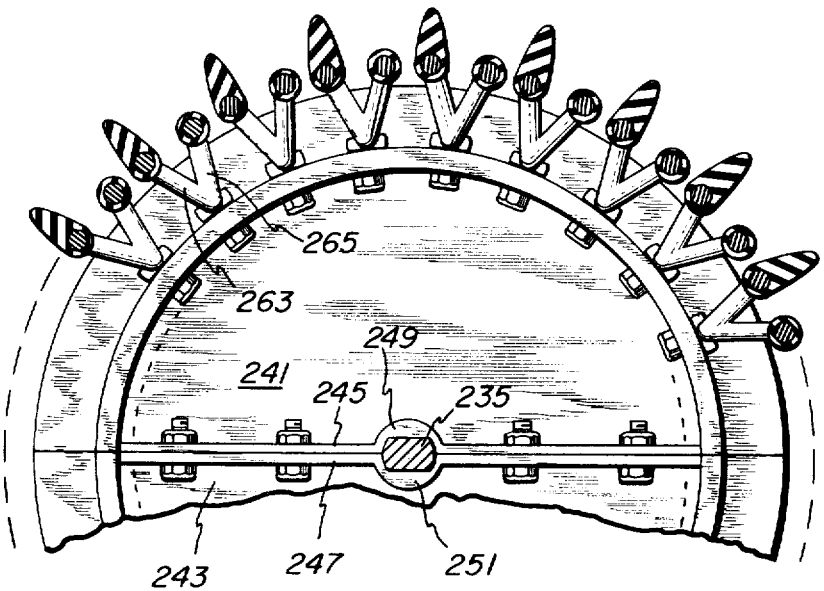
FIG. 17 is a partial sectional view taken in the direction of the arrows 17—17 in FIG. 12.
Figure 18:
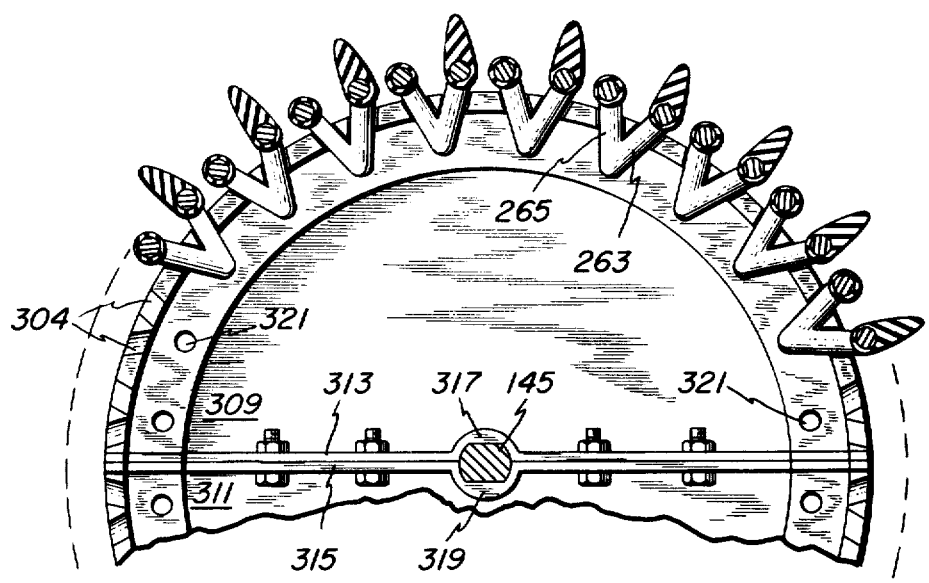
FIG. 18 is a partial sectional view taken in the direction of the arrows 18—18 in FIG. 12.
Figure 19:
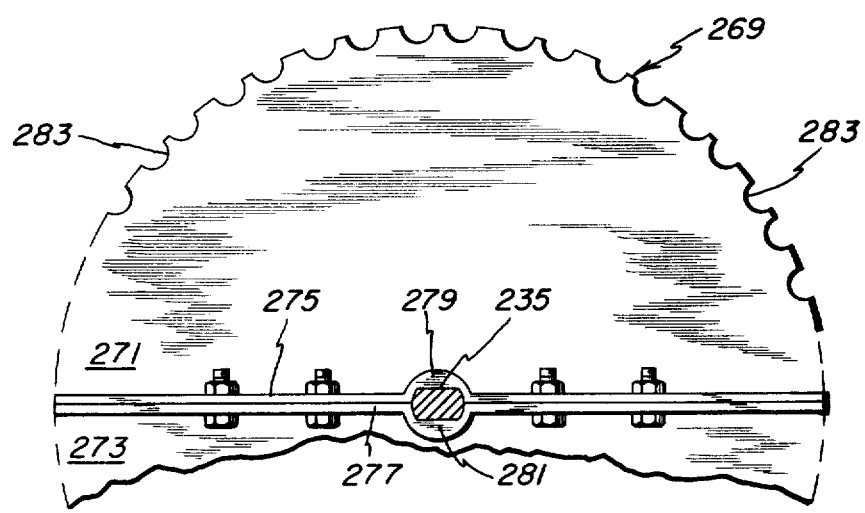
FIG. 19 is a partial sectional view taken in the direction of the arrows 19—19 in FIG. 12.
Figure 20:
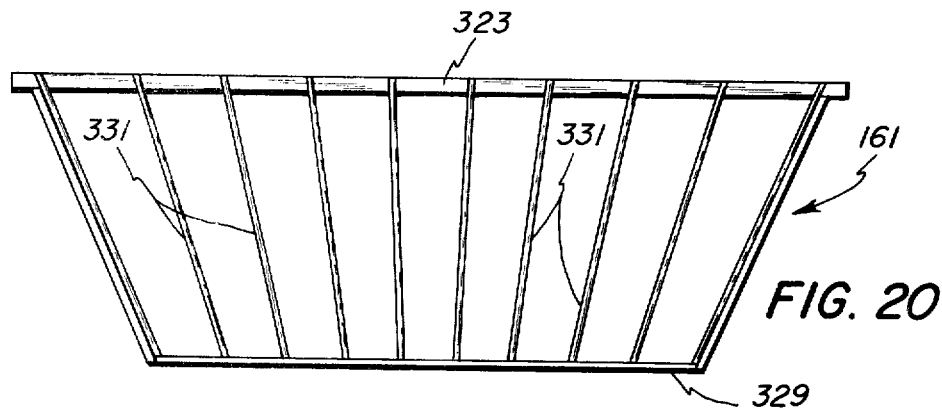
FIG. 20 is a plan view of the upper shaker-tine assembly.
Figure 21:
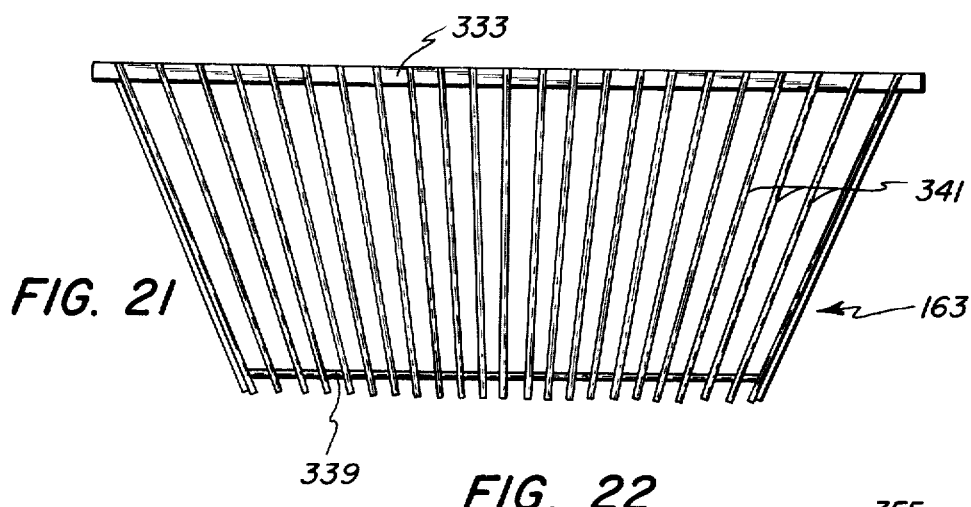
FIG. 21 is a plan view of the lower shaker-tine assembly.
Figure 22:
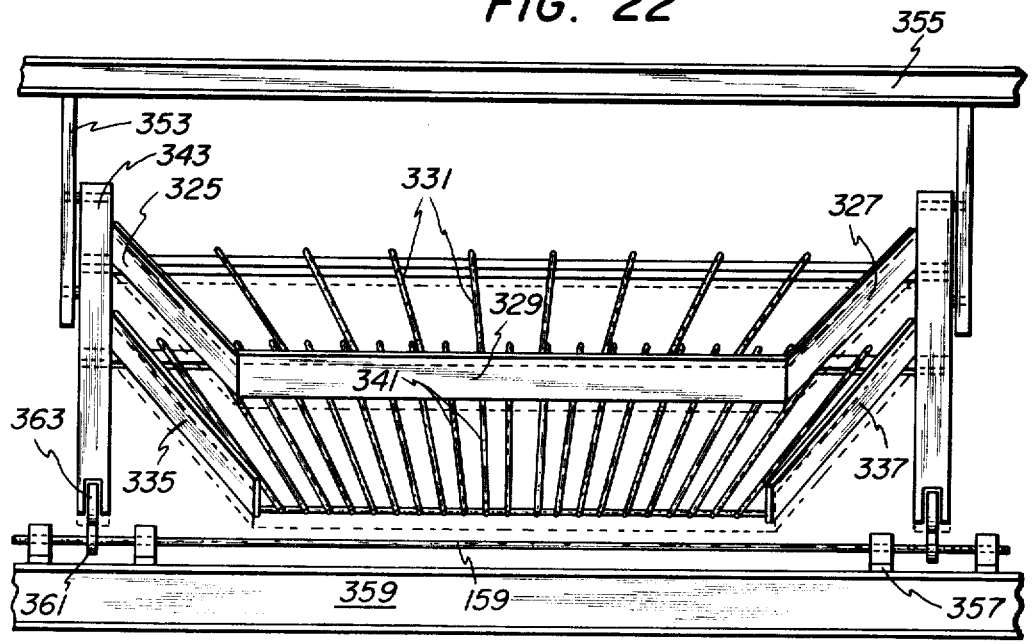
FIG. 22 is a front elevation of the shaker-tine assemblies showing the shaking movement caused by the cam action.
Figure 23:
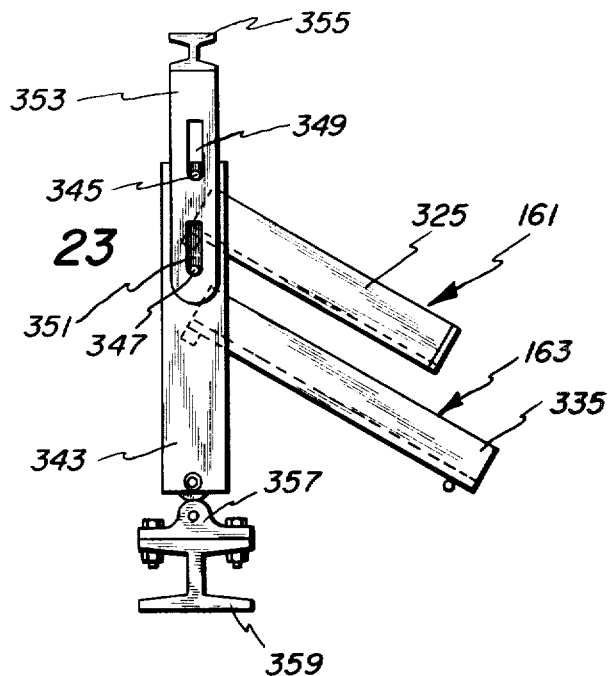
FIG. 23 is a side elevation view of the shaker-tine assemblies.
Figure 24:
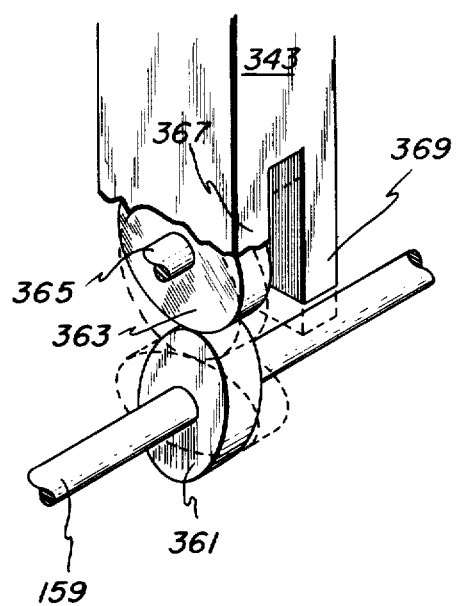
FIG. 24 is an enlarged isometric detail of the cam operation.
Figure 25:
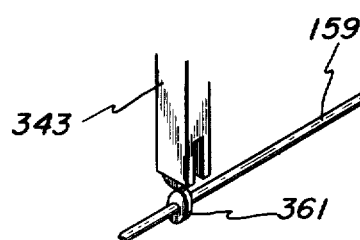
FIG. 25 is an isometric view of the bottom of the vertical members showing the position of the cams.
Figure 26:
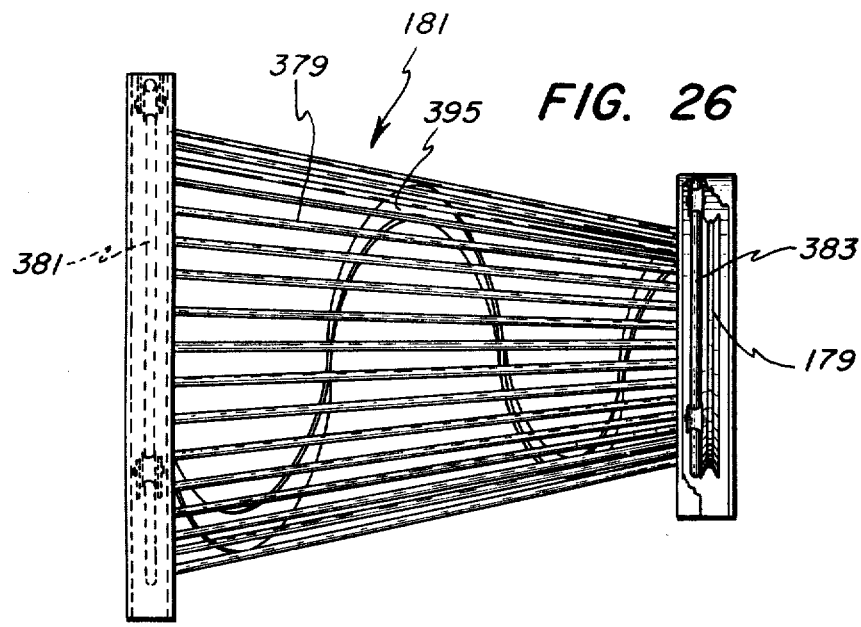
FIG. 26 is a side elevation of the conical cage with its upper and bottom support housings.
Figure 27:
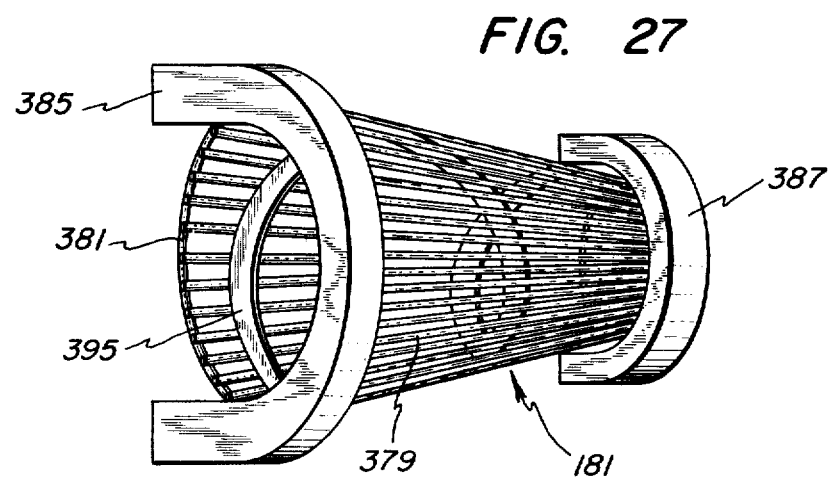
FIG. 27 is a plan view of the conical cage as it appears in position on the apparaus.
Figure 33:
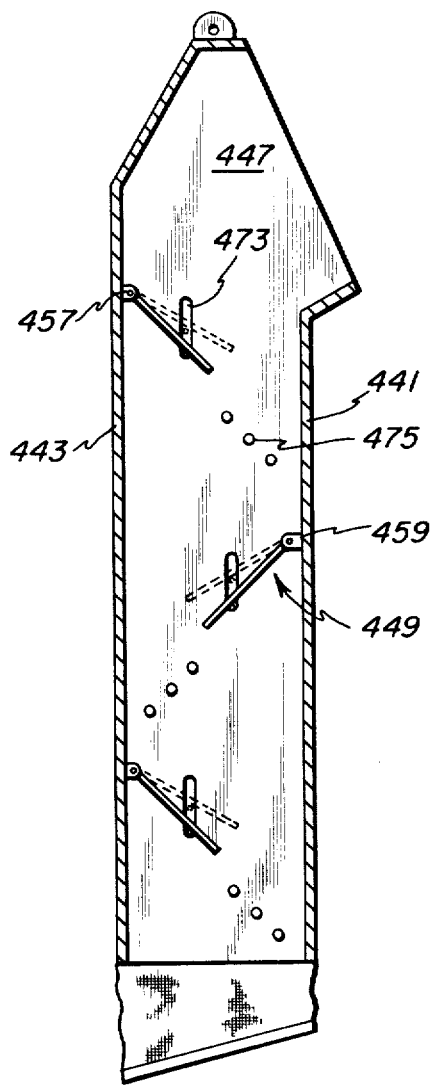
FIG. 33 is a side elevation section of the interior of the multi-positionable loading boom showing the detail of the directional vanes.
Figure 34:
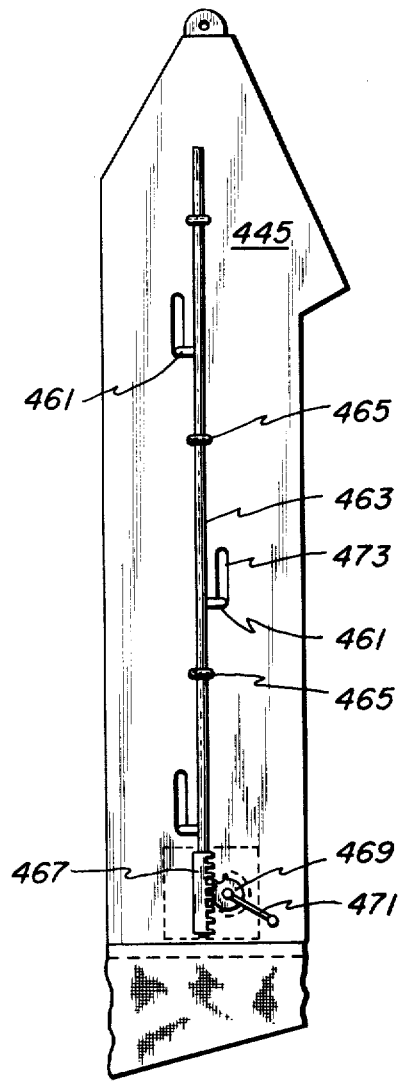
FIG. 34 is a side elevation view of such loading boom showing exterior details.
Figure 38:
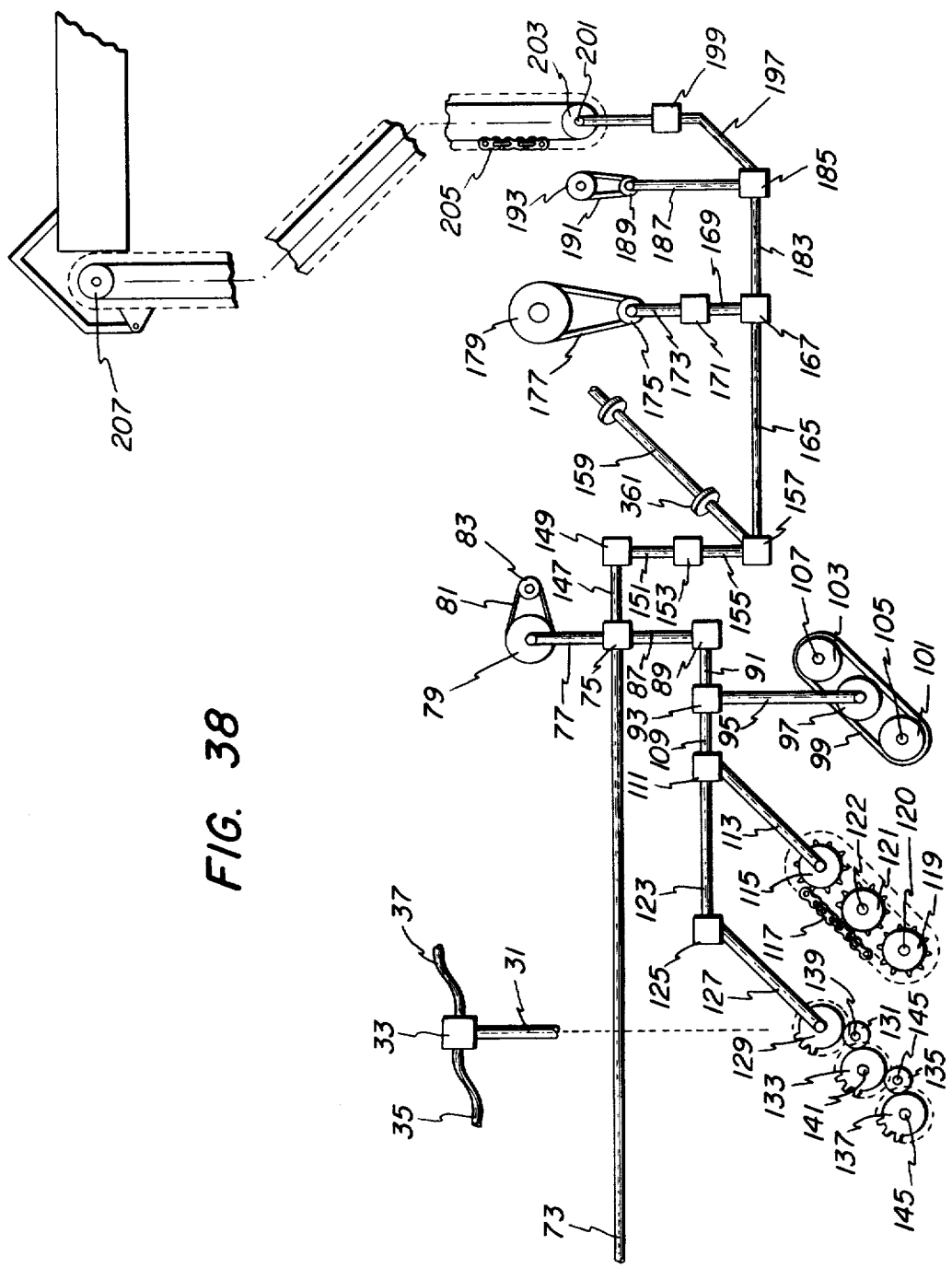
FIG. 38 is a diagram of the drive transmission from the main drive shaft.

As shown in FIGS. 16, 17 and 18, the tines 263 and 265 of the cylindrical cages 23, 25 and 27 are rubber-coated to prevent bruising of the potatoes because at this stage of the material flow very little dirt remains on the potatoes and the potatoes are highly susceptible to bruising.

Also, it should be appreciated that if any tine should break or otherwise need replacement, it is relatively easy and simple to quickly remove and replace a broken tine by removing and replacing the broken twin-tine rod 257 with a new one. This procedure involves very little machine down time because the broken twin-tine rod 257 is simply unbolted, removed and replaced with a new twin-tine rod 257 that is appropriately positioned and bolted in place.

With reference to FIGS. 1, 20, 21, 22, 23, 24 and 25, the upper and lower shaker-tine assemblies 161 and 163 are shown.

Upper shaker-tine assembly 161 has upper cross element 323, converging lateral walls 325 and 327 and front wall 329. Tines 331, convergingly arranged as shown, are suitably fixed to upper cross element 323 and front wall 329.

Lower shaker-tine assembly 163 has an upper cross element 333, converging lateral walls 335 and 337, and front element 339. Tines 341, converging arranged as shown, are suitably fixed to upper cross element 333 and front element 339.

The upper cross elements 323 and 333 are suitably fixed to vertical members 343 which have, in transverse relationship, outwardly projecting pins 345 and 347 received in and operatively engaged with guide slots 349 and 351 of vertical mounting brackets 353 suitably fixed to and depending from I-shaped superstructure 355. Pillow blocks 357, upstanding from I-shaped superstructure 359, journal shaft 159 carrying cams 361 operatively engaged with followers 363 disposed within and mounted by cross pins 365 in bifurcated legs 367 and 369 of vertical members 343. Drive transmitted from cams 361 to the roller followers 363 produces up and down as well as shaking movement of the tine assemblies 161 and 163 from the movements of the pins 345 and 347 in guide slots 349.

Grinder suction fan 85 has an intake hood 371 arranged and disposed in parallel relationship above and over the tines 331 of the upper shaker-tine assembly 161 to suck up and grind into little pieces the vines which are deposited from the rubber-coated cylindrical cage 27 upon tine 331 and which vines slide down tines 331. Grinder fan 85 has an exhaust duct 373 in communication with a conductor pipe 375 which deposits the vines upon a spreading pan 377, sloped downwardly as shown. Spreading pan 377 deposits the vines in the harvesting track beneath the apparatus 1.

With reference to FIGS. 1, 2, 26, 27, 28, 29, 30 and 31, conical cage 181 is shown. Conical cage 181 has lateral tines 379 fixed to the interior portions of upper and bottom rings 381 and 383 defining thereby a truncated right circular cone. Upper and bottom U-shaped support housings 385 and 387 are fixed to superstructure 389. Upper and bottom roller pulleys 391 and 393, fixed in mounting relationship on support housings 385 and 387, engage the respective upper and bottom rings 381 and 383 to mount the conical cage 181 with respect to its support housings 385 and 387. Conical cage is rotated clockwise by the drive belt 177 operatively engaged with the driven pulley 177 fixed to the bottom of bottom ring 383. Conical cage 181 is disposed and positioned to receive the potatoes that drop through the tines 331 of the upper shaker-tine assembly 161 onto the tines 341 of the lower shaker-tine assembly 163 and slide, by action of gravity, down the tines 341 into conical cage 181. A helical rubber vane 395 fixed to the clockwise rotating conical cage 181 serves to carry the potatoes along and through the bottom of the conical cage 181 without bruising same and to deposit the potatoes upon the conveyor 397 operatively carried by conveyor chain 205.

Conveyor 397 is horizontally disposed beyond a platform 399 and a container 401 for holding stones. Thereafter conveyor 397 rises at an upward angle and then is horizontally disposed outwardly to define the horizontal boom portion 403 of conveyor 397.

Frame 405 fixedly carries suction fan 195 which has an intake hood 407 to suck up any remaining bits and pieces of vines that may not have been removed in the material flow and have been carried to and deposited on conveyor 397. Such bits and pieces or other debris are discharged rearwardly from exhaust duct 409.

Platform 399 allows a workman to position himself comfortably thereon for hand removal of any stones that may be deposited on conveyor 397.

The discharge end of conveyor 397 communicates with and discharges the potatoes into a multi-positionable loading boom 411. Boom 411 is pivotally mounted with respect to the horizontal boom portion 403 of conveyor 397 by means of pivot pins 413, carried by the frame sidewalls 415 of conveyor 397, that are disposed in aligned holes in the upstanding ears 417 of boom 411.

A double-acting hydraulic cylinder 419 is pivotally mounted at its one end by means of a trunnion mounting with respect to ears 421 upstanding from a cross member 423 fixed to frame sidewalls 415. At its other end, hydraulic cylinder 419 is pivotally mounted by means of a trunnion mounting with respect to links 425. One end of each link 425 is pivotally mounted by means of a cross pin 427 engaged with a hole in ear 429 upstanding from cross member 431 fixed to frame sidewalls 415. The other end of each link 425 is pivotally mounted by means of a cross pin 433 engaged with a hole in one end of an L-shaped link 435. Ears 437 on boom 411 have a cross pin 439 engaged with holes in the other ends of L-shaped links 435. Appropriate actuation of hydraulic cylinder 419 will cause boom 411 to occupy the various positions shown in FIG. 37.

Boom 411 is of elongated configuration. As viewed in FIGS. 35 and 36, and in particular with respect to the direction of the flow of the potatoes from the discharge end of the conveyor into boom 411, boom 411 has a front wall 441, rear wall 443 and side walls 445 and 447.

Directional vanes 449 are adjustable. The directional vanes 449 direct and slow down the downward movement of the potatoes into a loading vehicle or body 451 to prevent bruising or damaging the potatoes. The directional vanes 449 have tines 453 fixed to lateral elements 455. The lateral elements 455 fixedly carry pins 457 pivotally mounted in the holes of ears 459 interiorly projecting from the front and rear walls 441 and 443.

Adjustment of the directional vanes 449 is effected by cross pins 461 fixed to rod 463 that is freely received and guided by U-bolts 465 mounted on the exterior surface of side wall 445. Reciprocation of rod 463 is effected by means of a rock 467 fixed to rod 463. Rack 467 is operatively engaged by a pivotally mounted pinion 469 to which a handle 471 is fixed to manipulatively facilitate and effect such reciprocation. The cross pins 461 bear against the lateral elements 455 of the directional vanes 449. The cross pins 461 engage and are guided by vertical guide slots 473.

Flexible members 475, such as rubber bands, elastic members and the like are fixed to the side walls 445 and 447. Flexible members 475 act as impact dampeners to absorb the impact of the potatoes and have enough "give" to allow the potatoes to pass between the flexible members 475. Accordingly, in its downward descent in boom 411, a potato will not be bruised or otherwise damaged because its impact will be absorbed by the flexible members 475. A canvas bag 477 is appropriately carried on the discharge end of boom 411, as shown.

When a loading vehicle or other body 451 is being filled with potatoes, hydraulic cylinder 419 is appropriately actuated to cause boom 411 to be moved back and forth so that the potatoes will evenly fill the loading vehicle without bruising the potatoes. When the loading vehicle is filled, such as half way or to the extent that the potatoes in the loading vehicle will interfere physically with further filling operation from boom 411, the hydraulic cylinder 419 would be appropriately actuated to position boom 411 in an upright position 479 and thereafter the remaining space in the loading vehicle would be filled by direct discharge of the potatoes from the discharge end of conveyor 397.

In operation, a tractor or other suitable prime mover hauls the apparatus 1 along the row of potatoes to be harvested. The disk coulters 63 and 65 separate and cut the vines between the rows of potatoes. Share 7 imbeds itself deep enough in the ground below the potatoes to dig up the potatoes, and to raise up the dirt and potatoes a couple of inches. The raised dirt and potatoes meet the clockwise rotating primary cylindrical cage 11, as viewed in FIG. 1.

All the cylindrical cages 11, 13, 15, 17, 19, 21, 23, 25 and 27 rotate clockwise and rotate at the same rate of material-flow speed which is fast enough to pick up and transfer the dirt, potatoes and vines. For example, since the diameter of cage 11 is less than the diameter of each of the cages 13 and 15, cage 11 must rotate at a faster speed than cages 13 and 15 so that the material-flow speed of cage 11 compared to cages 13 and 15 will be the same. Since cylindrical cage 11 rotates at the same material-flow speed, no dirt accumulates in front of cylindrical cage 11.

To aid in preventing vines, dirt and potatoes from bunching up and clogging in front of the cylindrical cage 11, the counterclockwise rotating cylinder raker 9 so assists. In the event a stone, in the material flow, strikes cylinder raker 9, the limit-stop mechanism previously described herein further functions to rise up to allow the stone to pass and cylinder raker 9 returns to its prior operating position. Cylinder raker 9 has upstanding rubber paddles 209 to avoid bruising or otherwise damaging the potatoes. Raker 9 is disposed in a particular adjusted position so that raker 9 picks up only the excess of vines, dirt and potatoes that the primary cylindrical cage 11 can not handle and moves same onto the second one of the primary cylindrical cages 13. it should also be noted that an excess of dirt from a ground contour will cause raker 9 to rise up.

The primary cylindrical cages 11, 13 and 15 sift about 10% of the dirt from the potatoes through cages 11, 13 and 15 and into the harvesting track on the ground. The first primary cylindrical cage 11 is smaller in diameter than cages 13 and 15 that have the same diameters, and cage 11 is closer to the ground than the other cages 13 and 15 to facilitate picking up of the potatoes, vines and dirt.

The three secondary cylindrical cages 17, 19 and 21 are larger in diameter than primary cylindrical cages 13 and 15. Most of the dirt will drop off of the potatoes and sift through and between the secondary cages 17, 19 and 21. The material flow over the primary and secondary cages will break up the dirt clods. The secondary cages take care of about 80% of the dirt on the potatoes and in the material flow.

In the material flow, the three rubber-coated cylindrical cages 23, 25 and 27, that are all of the same diameter and of the same diameter as the secondary cylindrical cages 17, 19 and 21, act upon the vines and upon the then practically bare potatoes that have little attached dirt. The rubber-coated cylindrical cages 23, 25 and 27 account for about 5% of the dirt. The rubber-coated tines 263 and 265 of the cylindrical cages 23, 25 and 27 pick up the potatoes and vines and convey them further upward and forward without bruising or otherwise damaging the potatoes.

Beyond the apex of the last rubber-coated cylindrical cage 27 in the material flow, the potatoes and vines fall downwardly at a sufficient slide angle of the tines 331 of the upper shaker-tine assembly 161. Such vines continue to slide on tines 331 and the intake hood 371 of suction fan 85 sucks them up.

Since the spacing between the tines 331 of the upper shaker-tine assembly 161 is twice that of the spacing between the lower tines 341, the potatoes drop through the upper tines 331 and onto the lower tines 341. The shaking action from the drive imparted to the upper and lower tine assemblies 161 and 163 assists in the gravity action of the downward material flow and in removing remaining dirt from the potatoes.

The grinder suction fan 85 sucks up the vines from the upper tines 331, grinds such vines into little pieces and deposits same via spreading pan 377 in the harvesting track beneath the apparatus 1 where the pieces of deposited vines are covered by dirt sifting down and through all of the cylindrical cages.

The converging lateral walls 325 and 327 of the upper tine assembly 161 prevent the vines and potatoes from falling over the sides. Likewise, the converging lateral walls 335 and 337 of the lower tine assembly 163 prevent the potatoes from falling over the sides.

From the foregoing description, it should be appreciated that the apparatus 1 of this invention removes practically all the dirt from the potatoes without bruising or otherwise damaging the potatoes. The vines are cut up into little pieces, deposited in the harvesting track and covered with dirt. In the prior art, the vines get stuck in the equipment and cause malfunction and equipment breakdown. And the vines remain in the material flow of the potatoes being harvested and have to be separated by hand. The apparatus 1 of this invention removes 95 to 98% of the dirt from the potatoes leaving them virtually clean without bruising or otherwise damaging them. The harvest ground speed of the apparatus can be maintained at a speed that is at least one-third to one-half times faster than the prior art. The apparatus can maintain a harvest ground speed of 3 MPH. In the prior art, the harvest ground speed is 2 MPH or less, and under wet conditions 1 MPH. The conveyor chains in the prior art wear quickly, loosen up and malfunction or break. Break-down time in the prior art to repair conveyor chains takes up at least one-third of the harvest time. In the prior art, a considerable quantity of the harvested potatoes are bruised or otherwise damaged.

Having thusly described my invention, I claim:

1. A potato harvesting apparatus for harvesting potatoes at maximum ground speed without regard to wet conditions, for removing during such harvesting operation practically all the dirt from the potatoes without bruising or otherwise damaging the potatoes, for separating the potato vines from the potatoes, for removing said separated potato vines and depositing same in the harvesting track and covering same with the dirt removed from the potatoes; said apparatus comprising a share, disk coulters, a cylindrical raker, primary, secondary and tertiary cylindrical cages, drive transmission means, shaker-tine means, a grinder suction fan and conductor pipe, cutting means and a conical cage; said share digging up the potatoes sufficiently for pick up by a first one of said primary cylindrical cages for transfer over to said primary, secondary and tertiary cylindrical cages, said cylindrical cages being in the harvesting flow of the potatoes and being arranged and disposed in ascending relationship to one another starting, in order, with said primary cylindrical cages and followed by said secondary cylindrical cages and ending with said tertiary cylindrical cages, said disk coulters separating and cutting the vines between adjacent rows of potatoes, said cylindrical raker being arranged and disposed before and above said first one of said primary cylindrical cages to engage and pick up the excess of vines, dirt and potatoes that said first one of said primary cylindrical cages can not handle and to move such excess of vines, dirt and potatoes onto a second one of said primary cylindrical cages, the periphery of each of said cylindrical cages having a uniform diameter throughout, said drive transmission means being operatively connected with said cylindrical cages and causing all of said cylindrical cages to rotate in the same direction and at the same rate of material-flow delivery speed, said cylindrical cages engaging, picking up and transferring said potatoes and vines to said shaker-tine means for separating said potatoes from said vines, said shaker-tine means comprising a shaker-tine assembly having tines spaced apart to allow said potatoes to drop therethrough while retaining said vines thereon, said grinder suction fan being arranged and disposed above said shaker-tine assembly to suck up said vines, separated from said potatoes, remaining on said tines to grind said vines into little pieces and to conduct same through said conductor pipe and deposit same beneath said cylindrical cages in such harvesting track, said rotating cylindrical cages, while so engaging, picking up and transferring said potatoes and vines, engaging and removing the dirt from said potatoes, including breaking up dirt clods, and said cylindrical cages sifting the dirt removed from the harvested potatoes down and through said cylindrical cages to cover said little pieces of vines deposited in the harvesting track, said cutting means being arranged and disposed beneath said cylindrical cages to cut up any vines in the material flow that slip between said cylindrical cages, and said conical cage being arranged and disposed with respect to said shaker-tine assembly to receive and carry along through said conical cage without bruising same said potatoes separated from said vines.

2. A potato harvesting apparatus in accordance with claim 1, wherein said cylindrical raker carries rubber paddles in helical arrangement and disposition on its outer surface and rotates in the direction opposite to the direction of rotation of said cylindrical cages, to thereby engage and pick up the excess of vines, dirt and potatoes that said first one of said primary cylindrical cages can not handle and to move such excess of vines, dirt and potatoes onto said second one of said primary cylindrical cages.

3. A potato harvesting apparatus in accordance with claim 1, wherein, in the order of the harvesting flow of the potatoes, said secondary cylindrical cages define first, second and third secondary cylindrical cages and said tertiary cylindrical cages define first, second and third tertiary cylindrical cages, wherein said cutting means define upstanding cutting blades, wherein said upstanding cutting blades are mounted below and between said first and second secondary cylindrical cages, below and between said second and third secondary cylindrical cages, below and between said first and second tertiary cylindrical cages, and below and between said second and third tertiary cylindrical cages, to thereby cut up any vines in the harvesting flow that slip between said secondary and tertiary cylindrical cages.

4. A potato harvesting apparatus in accordance with claim 1, wherein said shaker-tine assembly having tines spaced apart to allow said potatoes therethrough defines an upper shaker-tine assembly, wherein said shaker-tine means has a lower shaker-tine assembly, wherein said lower shaker-tine assembly is arranged and disposed beneath said upper shaker-tine assembly, wherein said upper shaker-tine assembly is arranged beyond the apex of a last one of said tertiary cylindrical cages in the material flow and at a sufficient downward slide angle to cause said potatoes and vines to fall downward on said upper shaker-tine assembly, and wherein said potatoes, which drop through said tines of said upper shaker-tine assembly, drop onto said lower shaker-tine assembly.

5. A potato harvesting apparatus in accordance with claim 4, wherein said conical cage receives said separated potatoes from said lower shaker-tine assembly and wherein said conical cage has on its interior an upstanding helical rubber vane spiraling said potatoes received from said lower shaker-tine assembly to thereby carrying along said separated potatoes without bruising same.

6. A potato harvesting apparatus in accordance with claim 1, wherein said apparatus has associated therewith a loading boom to receive and discharge said potatoes from the material flow into a loading vehicle, said loading boom having directional vanes to direct and slow down the downward movement of said potatoes into such loading vehicle without bruising or damaging said potatoes, said boom having cooperating means to move said boom back and forth so that said potatoes will evenly fill such loading vehicle without bruising said potatoes.

7. A potato harvesting apparatus in accordance with claim 1, wherein each of said cylindrical cages comprises a shaft, discs and tines, said shaft mounting said discs in removable fixed relationship therewith, said discs mounting said tines in removable fixed relationship therewith, said tines, upon rotation of said shaft, engaging, picking up and transferring said potatoes while removing dirt from said potatoes including breaking up dirt clods and shifting the dirt removed from said harvested potatoes down and through said tines, said shaft having shoulder portions, said discs having hubs complemental with said shoulder portions, said discs having upper and lower halves with upper and lower common flanges with aligned bolt holes for removably bolting said upper and lower flanges together, each of said cylindrical cages having twin-tine rods defining said tines, each said twin-tine rod having a single end portion on one end and a single end portion having a hole therethrough on the other end, said discs having holes removably receiving and mounting said single end portions of said twin-tine rods, and said discs having ears with aligned holes for removably bolting together said single end portions that have the holes therethrough.

8. A potato harvesting apparatus in accordance with claim 1, wherein said apparatus has a loading boom for receiving and discharging said potatoes from the material flow into a loading vehicle without bruising or otherwise damaging said potatoes, said boom being of elongated configuration, said boom having front, rear and side walls, adjustable directional vanes and flexible members, said directional vanes directing and slowing down the downward movement of said potatoes, said flexible members absorbing the impact of said potatoes and having enough "give" to allow said potatoes to pass between said flexible members, said boom having cooperating means to move said boom back and forth so that said potatoes will evenly fill such loading vehicle, said directional vanes being in the interior of said loading boom defined by its said front, rear and side walls, said directional vanes having tines fixed to lateral elements and said lateral elements being in pivotal mounting relationship with said front and rear walls, said loading boom having a pinion operatively engaged with a rack fixed to a rod to reciprocate said rod and said rod having cross pins operatively engaged with said lateral elements of said directional vanes to adjustably position said directional vanes.

* * * * *